US 8,613,638 B2

United States Patent
Tsujiguchi et al.

(10) Patent No.: US 8,613,638 B2
(45) Date of Patent: Dec. 24, 2013

(54) DISMANTLING APPARATUS FOR FLAT-SCREEN TV AND DISMANTLING METHOD FOR FLAT-SCREEN TV

(75) Inventors: Masato Tsujiguchi, Osaka (JP); Yasuhiko Utsumi, Osaka (JP); Eiichiro Nishio, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 13/124,609

(22) PCT Filed: Dec. 16, 2009

(86) PCT No.: PCT/JP2009/070952
§ 371 (c)(1),
(2), (4) Date: Apr. 15, 2011

(87) PCT Pub. No.: WO2010/082424
PCT Pub. Date: Jul. 22, 2010

(65) Prior Publication Data
US 2011/0263175 A1 Oct. 27, 2011

(30) Foreign Application Priority Data
Jan. 15, 2009 (JP) ................. 2009-006910

(51) Int. Cl.
*H01J 9/50* (2006.01)
(52) U.S. Cl.
USPC .............................. 445/61; 445/2
(58) Field of Classification Search
USPC .............. 445/2, 66, 61; 29/281.4, 564.3, 762
See application file for complete search history.

(56) References Cited

U.S. PATENT DOCUMENTS

| 5,890,940 A * | 4/1999 | Rozema et al. ............... 445/2 |
| 6,186,848 B1 * | 2/2001 | Yotsumoto et al. .......... 445/2 |
| 2004/0233154 A1 | 11/2004 | Ono et al. |

FOREIGN PATENT DOCUMENTS

| CN | 1171984 A | 2/1998 |
| EP | 0822014 A2 | 2/1998 |
| JP | 06-168253 A | 6/1994 |
| JP | 9-27519 A | 1/1997 |
| JP | 10-167467 A | 6/1998 |
| JP | 10-263518 A | 9/1998 |
| JP | 2009-276469 A | 10/1998 |
| JP | 2000-099729 A | 4/2000 |

(Continued)

OTHER PUBLICATIONS

International Search Report for PCT/JP2009/070952.

(Continued)

*Primary Examiner* — Anne Hines
(74) *Attorney, Agent, or Firm* — Edwards Wildman Palmer LLP; David G. Conlin; Edmund J. Koundakjian

(57) ABSTRACT

A flat-screen TV dismantling apparatus comprises an inclined working bed having a tiltable placement surface on which a flat-screen TV can be placed, and a horizontal working bed having a horizontal placement surface. A flat-screen TV dismantling method comprises detaching a cabinet and a control circuit board while the flat-screen TV is inclined, and dismantling a flat-screen panel module while the flat-screen TV is in a horizontal position. Also, a flat-screen TV dismantling method comprises detaching a cabinet and a control circuit while a flat-screen TV is in a horizontal position, and dismantling a flat-screen panel module while evacuating. With the dismantling apparatus and dismantling methods, the dismantling operations can be effectively and safely performed in a recycling plant.

11 Claims, 12 Drawing Sheets

(56) References Cited

FOREIGN PATENT DOCUMENTS

| | | |
|---|---|---|
| JP | 2001-305502 A | 10/2001 |
| JP | 2004-342550 A | 12/2004 |
| JP | 2006-320783 A | 11/2006 |
| JP | 2007-216131 A | 8/2007 |
| JP | 2008-090225 A | 4/2008 |
| JP | 2008-90225 A | 4/2008 |
| JP | 2009-056437 A | 3/2009 |
| JP | 2009-112900 A | 5/2009 |
| JP | 2009-226300 A | 10/2009 |
| JP | 2009-254922 A | 11/2009 |
| JP | 2009-273985 A | 11/2009 |
| WO | WO-03/098654 A1 | 11/2003 |

OTHER PUBLICATIONS

European Search Report (mailed Jun. 8, 2012) in corresponding EP application No. EP09838389.6.

* cited by examiner

OPERATOR SIDE

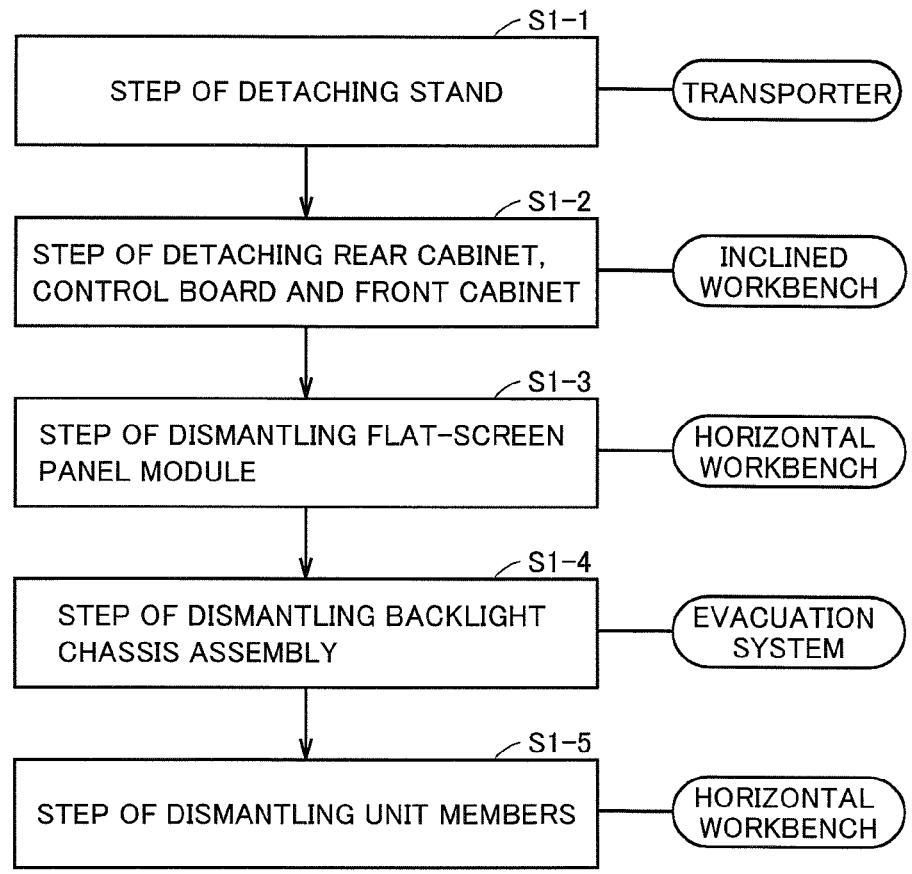
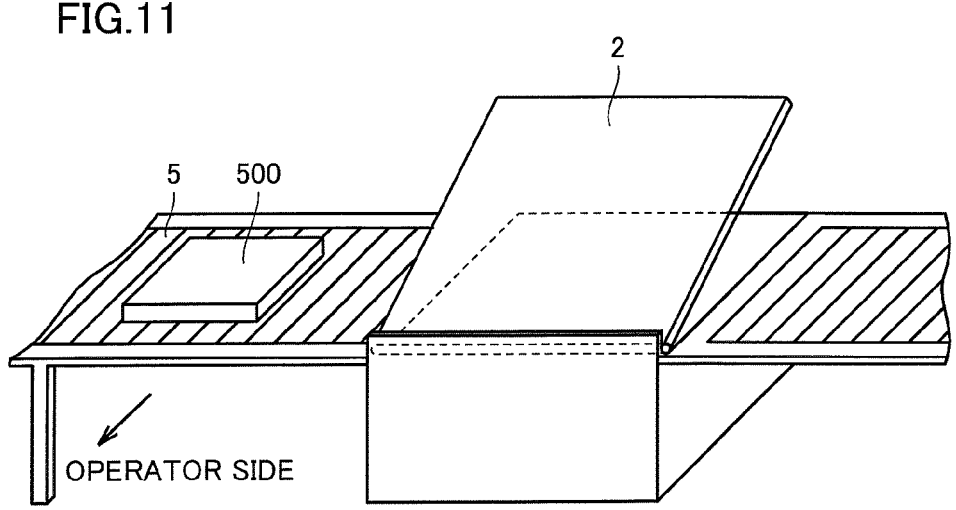

OPERATOR SIDE

DISMANTLING APPARATUS FOR FLAT-SCREEN TV AND DISMANTLING METHOD FOR FLAT-SCREEN TV

CROSS-REFERENCE TO RELATED APPLICATIONS

This application is the U.S. national phase, pursuant to 35 U.S.C. §371, of PCT international application Ser. No. PCT/JP2009/070952, filed Dec. 16, 2009, designating the United States and published in Japanese on Jul. 22, 2010 as publication WO 2010/082424 A1, which claims priority to Japanese patent application No. 2009-006910, filed Jan. 15, 2009.

TECHNICAL FIELD

The present invention generally relates to a dismantling apparatus for a flat-screen TV and a dismantling method for a flat-screen TV, and more specifically, it relates to a dismantling apparatus for a flat-screen TV set in a recycling plant for dismantling a flat-screen TV and a dismantling method for a flat-screen TV.

BACKGROUND ART

In relation to a conventional dismantling method for a flat-screen TV, Japanese Patent Laying-Open No. 2004-342550 (Patent Document 1) discloses an exchange method for a liquid crystal display aiming at simply executing lamp exchange at a low cost and suppressing reduction of display quality resulting from adhesion of foreign matter in exchange, for example. In the exchange method for a liquid crystal display disclosed in Patent Document 1, a lamp set exchangeable in minimum units is constituted by supporting a lamp, an inverter substrate, a return substrate, a return cable etc. by a lamp support frame.

Japanese Patent Laying-Open No. 2001-305502 (Patent Document 2) discloses a disposing method for a waste liquid crystal panel aiming at enabling ideal recycling hardly producing waste. The disposing method for a waste liquid crystal panel disclosed in Patent Document 2 includes a panel cutting step of cutting the liquid crystal panel in a state having a polarizing plate and a liquid crystal recovery step of recovering liquid crystals.

Japanese Patent Laying-Open No. 6-168253 (Patent Document 3) discloses a product dismantlement managing method aiming at properly executing a dismantling procedure for industrial waste and disposal of components. In the product dismantlement managing method disclosed in Patent Document 3, product codes such as the name of the product, the name of the maker etc. are displayed on the product body, while marks indicating the structures and codes indicating the names of materials are displayed on the components constituting the product.

Japanese Patent Laying-Open No. 10-263518 (Patent Document 4) discloses a dismantling apparatus for an electrical appliance aiming at automating dismantlement of a waste TV and improving the recycling ratio for separately recovered members. In the dismantling apparatus for an electrical appliance disclosed in Patent Document 4, an inclinable workbench is arranged in the vicinity of a first transport conveyor transporting a transport pallet.

PRIOR ART

Patent Document

Patent Document 1: Japanese Patent Laying-Open No. 2004-342550
Patent Document 2: Japanese Patent Laying-Open No. 2001-305502
Patent Document 3: Japanese Patent Laying-Open No. 6-168253
Patent Document 4: Japanese Patent Laying-Open No. 10-263518

SUMMARY OF THE INVENTION

Problems to be Solved by the Invention

A flat-screen TV loaded with a unit of a flat-screen panel (flat-screen panel unit) such as a liquid crystal panel, a plasma display panel (PDP), an organic EL panel, a field emission display panel or the like is known as a display. Combined with the recent surge of the interest in the global environmental problems as well as the digitization of television broadcasting, demand for this flat-screen TV abruptly increases due to the characteristics such as power saving, space saving and lightweightness and suitableness to receiving of digital broadcasting. In particular, demand for a large-sized flat-screen TV loaded with a large-sized flat-screen panel unit dramatically increases. Following this, it is predicted that the number of disposed flat-screen TVs hereafter also abruptly increases, and a requirement for improvement in recyclability of flat-screen TVs after disposal increases in environmental movement such as recycling movement.

Despite such increase of the requirement, no proper recycling method such as that for a conventional cathode-ray tube TV has been proposed since the flat-screen TV is a relatively new product and the quantity of waste thereof is relatively small under the present circumstances. A disposed flat-screen TV is currently crushed in waste disposal equipment and buried or incinerated along with shredder dust etc.

In the near future, a flat-screen TV loaded with a liquid crystal panel, a plasma display panel or the like is added to items to which the Household Appliance Recycling Law is applied. With such a background, development of a recycling technique for a flat-screen TV is urgently required.

However, a flat-screen TV is loaded with a large number of electronic components in an image processing circuit etc. due to the display principle thereof, and the number of printed circuit boards (control boards) tends to increase. Further, a large number of radiation fans, electromagnetic wave shields, reinforcing components and the like are used, and hence the quantity of screws for fastening dramatically increases as compared with a conventional cathode-ray tube TV. In dismantlement of the flat-screen TV, therefore, efficient detachment of the screws comes into question.

Following the recent requirement for a large-sized TV screen, the screen size and the weight of a flat-screen TV also dramatically increase, and handling of the flat-screen TV in dismantling operation comes into question. In addition, the flat-screen TV is handled through a large number of steps in dismantlement, due to the complicated structure thereof and increase in the number of the components loaded therein.

Glass used for a display portion of the flat-screen TV is extremely thin and easy to crack, as compared with glass used for the conventional cathode-ray tube TV. In view of recycling of the glass and safety in operation, a dismantling apparatus and a dismantling method not cracking the glass by an impact in the dismantling operation or the like are required.

In a liquid crystal TV included in flat-screen TVs, mercury which is a toxic substance may be used for a fluorescent tube of a light source. In order to prevent leakage of mercury into the atmosphere following breakage of the fluorescent tube, therefore, it is required to suppress an impact applied to the flat-screen TV in dismantlement and to perform safe treatment in dismantlement such as detachment of the fluorescent tube.

While the flat-screen TVs widely spreading at present are the liquid crystal TV and the PDP TV (plasma display panel TV), there are different portions in the structures of these, and hence an efficient dismantling apparatus and an efficient dismantling method applicable to both of the liquid crystal TV and the plasma TV are required, in consideration of application in a recycling plant in the near future.

Accordingly, objects of the present invention is to solve the aforementioned problems, and to provide a dismantling apparatus for a flat-screen TV and a dismantling method for a flat-screen TV, according to which dismantling operation is efficiently and safely carried out in a recycling plant.

Means for Solving the Problems

The dismantling apparatus for a flat-screen TV according to the present invention includes an inclined workbench having an inclinable receiving surface for receiving the flat-screen TV thereon, and a horizontal workbench having a horizontal receiving surface.

The dismantling apparatus for a flat-screen TV according to the present invention preferably further includes an evacuation system.

The dismantling apparatus for a flat-screen TV according to the present invention preferably further includes a transporter for the flat-screen TV.

In the dismantling apparatus for a flat-screen TV according to the present invention, the receiving surface of the horizontal workbench is preferably rotatable in a horizontal plane.

The evacuation system in the dismantling apparatus for a flat-screen TV according to the present invention preferably includes a mercury removing means, a blower and a pipe.

The inclined workbench in the dismantling apparatus for a flat-screen TV according to the present invention preferably has an inversion function for the flat-screen TV.

The dismantling method for a flat-screen TV according to the present invention includes the steps of detaching a cabinet and a control board in a state inclining the flat-screen TV, and dismantling a flat-screen panel module in a state horizontalizing the flat-screen TV.

The dismantling method for a flat-screen TV according to the present invention preferably further includes a step of dismantling a backlight chassis assembly of the flat-screen panel module loaded with a fluorescent tube.

The present invention also provides a dismantling method for a flat-screen TV including the steps of detaching a cabinet and a control board in a state horizontalizing the flat-screen TV, and dismantling a flat-screen panel module under an evacuation system.

The flat-screen TV in the present invention is preferably a liquid crystal TV or a plasma TV.

Effects of the Invention

According to the present invention, a dismantling method for a flat-screen TV and a dismantling method for a flat-screen TV, according to which dismantling operation is efficiently and safely performed in a recycling plant, can be provided.

BRIEF DESCRIPTION OF THE DRAWINGS

FIG. 10 is a flow chart showing the dismantling method for a flat-screen TV according to the present invention in a case where the flat-screen TV is a large-sized liquid crystal TV such as direct backlight type TV 51 whose screen size is at least 26 inches, for example, in a stepwise manner.

FIG. 11 is a diagram schematically showing an example of carrying out a step (step S1-1) of detaching a stand in the dismantling method for a flat-screen TV according to the present invention with dismantling apparatus 1 shown in FIG. 1.

MODES FOR CARRYING OUT THE INVENTION

<Dismantling Apparatus for Flat-Screen TV>

Figure 1:
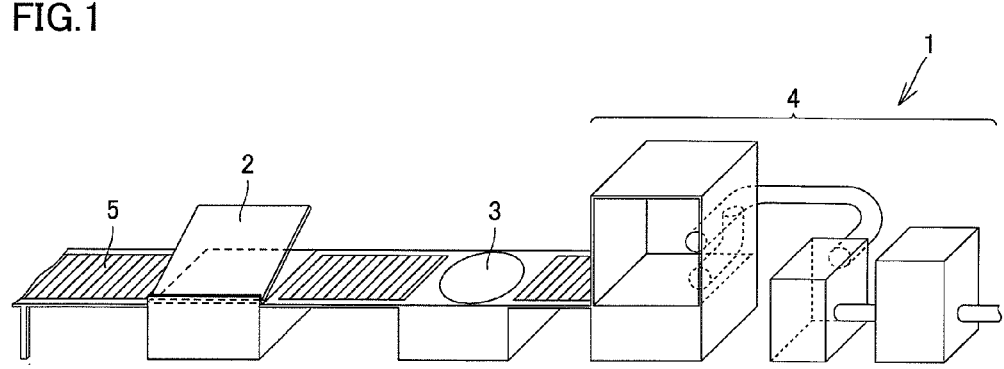
FIG. 1 is a diagram schematically showing a dismantling apparatus 1 for a flat-screen TV according to a preferred embodiment of the present invention.

FIG. 1 is a diagram schematically showing a dismantling apparatus 1 for a flat-screen TV according to a preferred embodiment of the present invention. Dismantling apparatus 1 for a flat-screen TV according to the present invention basically includes an inclined workbench 2 having an inclinable receiving surface for receiving the flat-screen TV thereon and a horizontal workbench 3 having a horizontal receiving surface, as schematically shown in FIG. 1.

In the present invention, the type of the flat-screen TV dismantled by dismantling apparatus 1 is not particularly restricted, so far as the same is a flat-screen TV loaded with a unit of a flat-screen panel such as a liquid crystal panel, a plasma display panel (PDP), an organic EL panel, a field emission display panel or the like. In the following description, a case of dismantling a liquid crystal TV loaded with a liquid crystal panel and a plasma TV loaded with a PDP which are major two types of flat-screen TVs widely spread at present is described.

Figure 2:
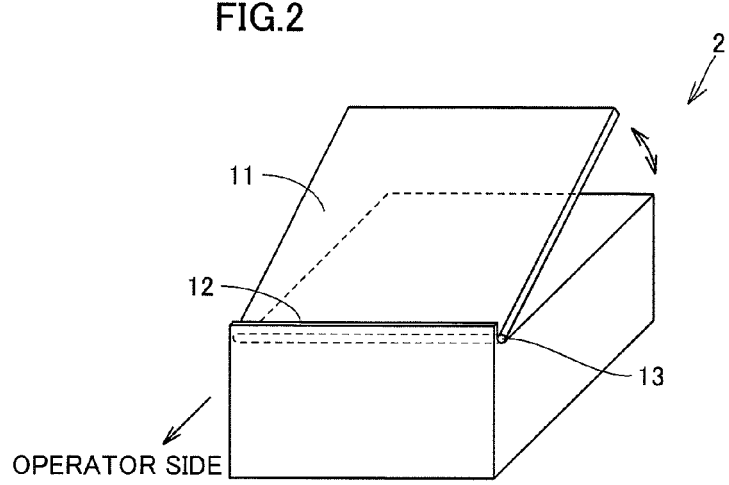
FIG. 2 is a diagram schematically showing an example of an inclined workbench 2 loaded into dismantling apparatus 1 for a flat-screen TV according to the present invention.

FIG. 2 is a diagram schematically showing an example of inclined workbench 2 loaded into dismantling apparatus 1 for a flat-screen TV according to the present invention. Inclined workbench 2 in the present invention includes a receiving surface (stage) 11 for receiving the flat-screen TV thereon. The stage is basically inclined to be low on a dismantling operation engager (operator) side, as shown in FIG. 2. A protrusion 12 is provided on the operator side, to prevent the flat-screen TV from slipping down when the same is placed on the inclined stage. The operator dismantles the flat-screen TV in a state inclining the same so that target components to be detached are directed toward the operator as shown in FIG. 2, whereby visibility of detached screws is improved, and efficient dismantlement is enabled. Also when dismantling a large-sized TV, the operator may not lean forward, but a burden on the body of the operator is reduced, and efficient operation is enabled.

The flat-screen TV is loaded with a large number of electronic components such as a driving IC, an inverter circuit, an image processing circuit and the like due to the display principle thereof, and the number of printed circuit boards (control boards) tends to increase. Further, a large number of radiation fans, electromagnetic wave shields, reinforcing components and the like are used, and hence the quantity of screws for fastening dramatically increases as compared with a conventional cathode-ray tube TV. In dismantlement of the flat-screen TV, therefore, how to efficiently perform detachment of the screws comes into question. The flat-screen TV is so inclined that the side loaded with members to be dismantled is directed toward the operator, whereby the operator can visually recognize the screws of the members in an upright posture without leaning forward. Thus, the operator can detach the screws in the upright posture with a small burden on the body. Also in a case of continuing long-time dismantling operation, reduction in operation efficiency resulting from fatigue is eliminated, and efficient operation is enabled.

Inclined workbench 2 in the present invention may be so formed that receiving surface 11 is movable. As in the example shown in FIG. 2, for example, a movable shaft 13 or the like is provided along one side of receiving surface 11 for forming receiving surface 11 shiftable from a horizontal state to an inclined state, whereby the flat-screen TV can be inclined by shifting receiving surface 11 to the inclined state after placing the flat-screen TV on receiving surface 11 of the horizontal state. Thus, the operator may not raise the flat-screen TV to move/place the same onto inclined receiving surface 11, but can easily move/place the flat-screen TV from a transporter 5 (described later in detail) onto receiving surface 11 in the horizontal state as such.

If receiving surface 11 is not formed to be movable as described above, the operator must raise the flat-screen TV in order to move/place the flat-screen TV from transporter 5 in a horizontal state onto inclined receiving surface 11, while the flat-screen TV is so heavyweight and large-sized that it is difficult for the operator to raise the flat-screen TV alone. If the operator forcibly raises a heavy object, this results in dangerousness in operation.

According to the present invention, as hereinabove described, inclined workbench 2 is so formed that receiving surface 11 is movable between the inclined state and the horizontal state, whereby the operator may not raise the heavyweight flat-screen TV, movement/placement is simplified, and reduction of operation efficiency resulting from fatigue as well as danger at the time of handling the heavyweight flat-screen TV can be prevented. Also when moving/placing the flat-screen TV from inclined workbench 2 onto transporter 5, improvement of the operation efficiency and safe operation are enabled by shifting receiving surface 11 from the inclined state to the horizontal state. Further, dismantling operation in the inclined state and dismantling operation in the horizontalized state are enabled without moving the flat-screen TV, and a state suitable to operation can be selected in response to the case.

Further, inclined workbench 2 may have a function of inverting the flat-screen TV. The screws for fastening the members of the flat-screen TV are generally tightened from both surfaces, i.e., the front surface and the rear surface of the flat-screen TV. In the case of the liquid crystal TV, for example, a rear cabinet, a control board and a front cabinet are screwed from a side opposite to a screen of a display, i.e., from the rear surface. A liquid crystal panel module is screwed from the side of the display screen, i.e., from the front surface.

When dismantling the liquid crystal module after detaching the front cabinet, therefore, the flat-screen TV must be inverted from a state where the rear surface is directed upward to a state where the front surface is directed upward. A large-sized flat-screen TV is so heavyweight and large-sized that a heavy burden is applied to the body of the operator if the operator engaging in dismantlement raises and inverts the same alone. Further, this may lead to reduction of operation efficiency resulting from fatigue. When the inclined workbench has the inversion function, the operator can invert the flat-screen TV without raising the same, the burden on the body of the operator can be reduced, and reduction of operation efficiency resulting from fatigue can be prevented.

Figure 3:
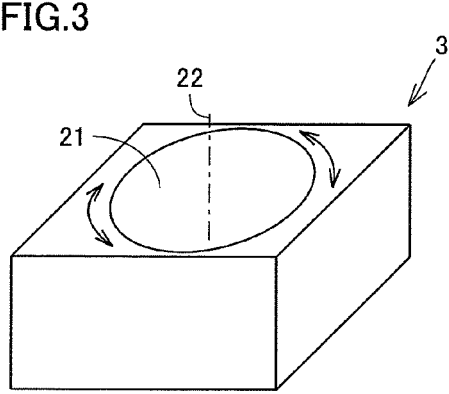
FIG. 3 is a schematic diagram showing an example of a horizontal workbench 3 loaded into dismantling apparatus 1 for a flat-screen TV according to the present invention.

FIG. 3 is a diagram schematically showing an example of horizontal workbench 3 loaded into dismantling apparatus 1 for a flat-screen TV according to the present invention. Horizontal workbench 3 in the present invention basically includes a receiving surface 21 receiving the flat-screen TV thereon and a rotating shaft 22, and is preferably so formed that receiving surface 21 is rotatable on rotating shaft 22. Thus, if the flat-screen TV includes screws on the side surfaces and the screws are hard to detach in the inclined state, the flat-screen TV can be rotated on rotating shaft 22 along with receiving surface 21 to a side suitable for operation in a state placed on receiving surface 21 of horizontal workbench 3 even if the flat-screen TV is large-sized and heavyweight, to be easily handled.

A stand unit recovered by dismantlement is constituted of a plastic cover, metal hinges, metal members and the like, and the stand unit must be further dismantled and recovered every stuff, to be recycled as the stuff. A speaker unit is constituted of a speaker cover of metal or plastic, a speaker made of ferrite or the like etc., and the speaker unit must be further dismantled and recovered every stuff, to be recycled as the stuff. These members (unit members) are desirably dismantled on easily stabilizable horizontal workbench 3, since the shapes thereof vary with the type of the flat-screen TV.

A unified substrate (substrate unit) or the like is provided with a frame of plastic or metal, and the substrate unit must be further dismantled and recovered every stuff, to be recycled as the stuff. If a cabinet or the like is recovered, it may be necessary to further dismantle the cabinet in order to recycle the same as stuff. Dismantling operation in this case is also desirably performed on horizontal workbench 3.

A flat-screen TV (medium/small-sized flat-screen TV) whose screen size is less than 26 inches, for example, is lightweight and small-sized as compared with the large-sized TV, and hence easy to handle. Further, the size is so small that the overall flat-screen TV can be easily overseen, and hence screws are highly visible. In consideration of safety in dismantling operation, the small-sized flat-screen TV is preferably placed in a horizontal state. Therefore, the operator does not extremely lean forward in order to visually recognize the screws present in a complicated structure when detaching the screws of members, and hence the flat-screen TV is desirably dismantled on the horizontal workbench.

The horizontal workbench in the present invention is preferably so formed that the receiving surface is rotatable in a horizontal plane. FIG. 3 shows the example implementing receiving surface 21 to be rotatable in a horizontal plane by employing the mechanism of rotating receiving surface 21 on rotating shaft 22 of horizontal workbench 3, for example. Thus, the operator can quickly move the screws to be operated at hand, and the operation efficiency is further improved.

Thus, dismantling apparatus 1 for a flat-screen TV according to the present invention so includes horizontal workbench 3 that dismantlement of the unit members and dismantlement of the medium/small-sized flat-screen TV can be efficiently performed.

Figure 4:
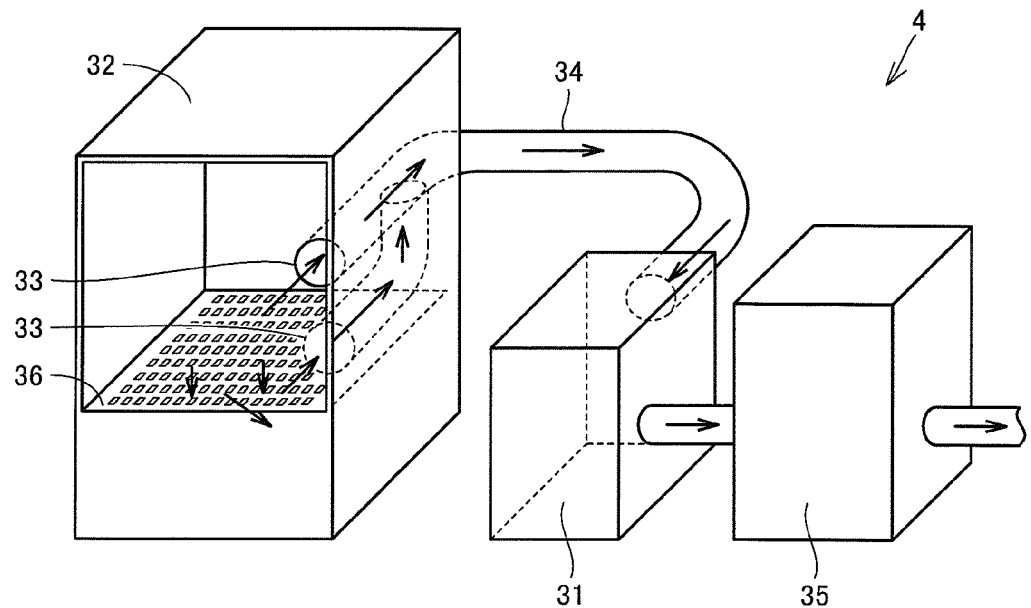
FIG. 4 is a schematic diagram showing an example of an evacuation system 4 loaded into dismantling apparatus 1 for a flat-screen TV according to the present invention.

FIG. 4 is a diagram schematically showing an evacuation system 4 of a preferred example employed in dismantling apparatus 1 for a flat-screen TV according to the present invention. Dismantling apparatus 1 for a flat-screen TV according to the present invention preferably further includes evacuation system 4, so that the operator can be prevented from sucking mercury, and dismantlement of a flat-screen TV improved in safety is enabled.

For a backlight loaded into a non-luminous liquid crystal TV among flat-screen TVs, a fluorescent tube employing a thin glass tube of about 3 mm in diameter is used in view of energy saving and high efficiency. As a result, the fluorescent tube is easily cracked when force is applied thereto in dismantling operation of the flat-screen TV. Further, while mercury is sealed into the fluorescent tube, there is a possibility that the operator engaging in dismantlement sucks the mercury if the fluorescent tube is broken during the dismantling operation. It has been confirmed that mercury once incorporated into a human body is not discharged out of the body but accumulated to cause affections such as nausea, diarrhea, insomnia and nerves. A backlight dismantling step for the flat-screen TV is so carried out under an evacuation means that the operator can be prevented from sucking mercury, damage caused on the operator by mercury can be suppressed, and dismantlement of the flat-screen TV improved in safety is enabled.

Dismantling apparatus 1 for a flat-screen TV according to the present invention includes the evacuation system sucking air above the flat-screen TV downward and discharging the sucked air by passing the same through a mercury removing means 31 as shown in FIG. 4, for example, as a means for removing mercury. Thus, mercury larger in specific weight as compared with air is not diffused upward, i.e., toward the direction of the face of the operator, and the operator can be prevented from health damage. Further, the evacuation system of the example shown in FIG. 4 includes a hood 32 provided to cover the flat-screen TV (not shown) and a sucking portion 33, and is formed to suck air above the flat-screen TV downward with sucking portion 33 and to discharge the air by feeding the same into a pipe. The evacuation system may also be formed to suck the air from the front side of the operator toward the other side. Thus, the mercury can be prevented from diffusing toward the direction of the face of the operator, and the operator can be prevented from health damage.

A proper well-known blower 35 or the like is coupled to sucking portion 33 by a pipe 34, to suck the air above the flat-screen TV from sucking portion 33. Mercury removing means 31 capable of purifying the air by adsorbing mercury vapor is provided on an intermediate portion of the pipe. As mercury removing means 31, an activated carbon filter can be employed, for example. Thus, mercury vapor is removed from the backlight broken during the dismantling operation.

Dismantling apparatus 1 includes such an evacuation system so that, if the backlight is broken and mercury vapor leaks out during the dismantling operation, the sucking portion sucks the air containing this mercury vapor, passes the same through mercury removing means 31 and thereafter forcibly discharges the same, whereby the mercury vapor does not remain in the working area, and can be prevented from causing remarkable health damage to the operator.

The evacuation system is preferably integrated with a horizontal workbench 36, as shown in FIG. 4. Further, the receiving surface of the workbench preferably includes a vent, due to the structure sucking the air downward as described above.

Figure 5:
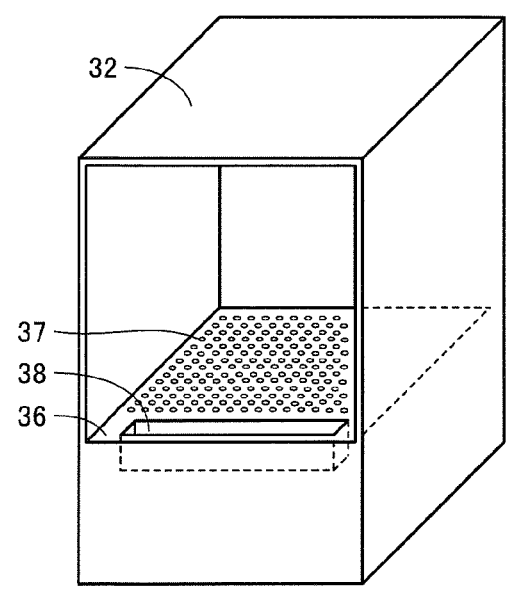
FIG. 5 is a diagram partially showing the example of evacuation system 4 shown in FIG. 4.

FIG. 5 is a diagram partially showing the example of evacuation system 4 shown in FIG. 4. For example, the receiving surface is so formed that circular vent holes 37 of 10 mm to 20 mm in diameter open while keeping intervals as shown in FIG. 5, whereby downward suction is enabled through the holes, and screws detached from the flat-screen TV can be dropped from the holes and prevented from scattering onto the receiving surface. Thus, workability is improved.

As shown in FIG. 5, a pocket 38 for storing the detached fluorescent tube is preferably included. Pocket 38 includes a vent having a mesh structure or the like, so that gas in pocket 38 is sucked downward. Thus, if by any chance the fluorescent tube is broken, the same is so quickly stored in pocket 38 that the operator can be prevented from sucking mercury and safety can be ensured.

The dismantling apparatus for a flat-screen TV according to the present invention preferably includes a closed vessel for storing a broken fluorescent tube. As the closed vessel, a well-known steel drum or the like can be employed, for example. Thus, such a possibility can be reduced that mercury contained in the broken fluorescent tube diffuses from the glass surface of the fluorescent tube at night or the like to contaminate the operation environment.

Figure 6:
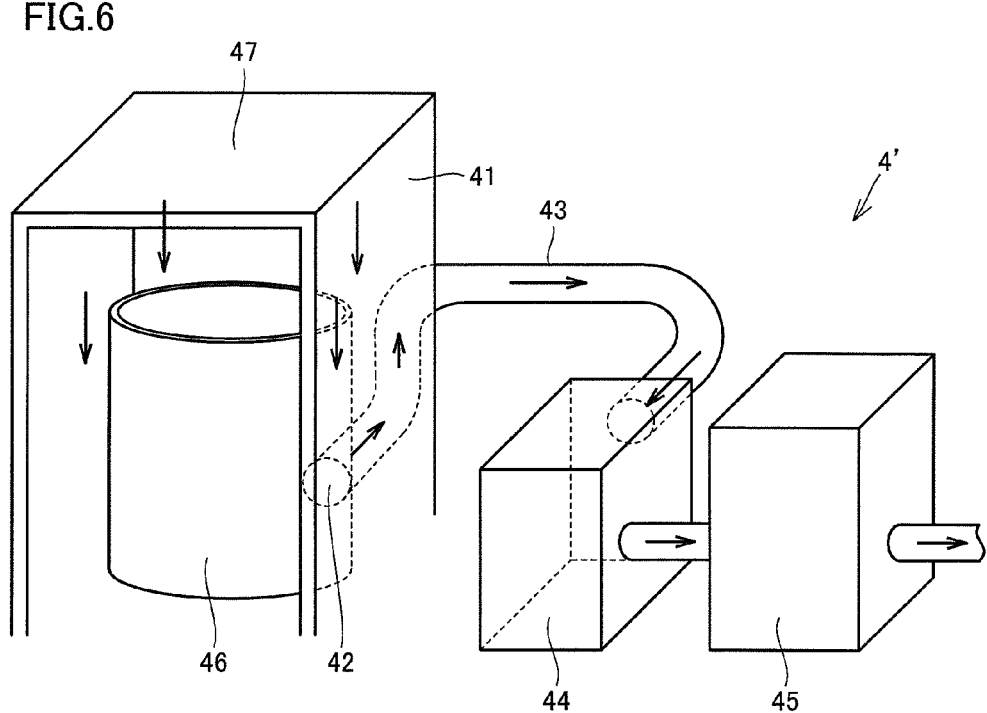
FIG. 6 is a schematic diagram showing an example of another evacuation system 4' loaded into dismantling apparatus 1 for a flat-screen TV according to the present invention.

FIG. 6 is a diagram schematically showing an evacuation system 4' of another preferred example employed in dismantling apparatus 1 for a flat-screen TV according to the present invention. Evacuation system 4' in dismantling apparatus 1 for a flat-screen TV according to the present invention more preferably includes a vessel evacuation system 41 to suck air from a portion close to a lower portion of a closed vessel 46. Vessel evacuation system 41 includes a suction port 42, a pipe 43, a mercury removing means 44 and a blower 45. Thus, if mercury diffuses from a broken fluorescent tube stored in the vessel to the outside of the closed vessel in opening/closing of closed vessel 46, mercury is sucked toward downward suction port 42 so that mercury can be prevented from diffusing/leaking into the environment of the operator. Mercury removing means 44 and blower 45 are connected to suction port 42, so that gas containing mercury sucked from the suction port is discharged as normal gas from which mercury is removed. The mercury removing means and the blower can be shared with those of aforementioned evacuation system 4. Evacuation system 4' more preferably includes a hood 47 covering the closed vessel.

According to the inventive dismantling apparatus for a flat-screen TV structured in this manner, inclination and inversion of the flat-screen TV can be performed through simple operation, whereby effective dismantling operation for a flat-screen TV can be performed by inclining the flat-screen TV toward the operator side thereby improving visibility of the screws in response to the contents of dismantling steps. Further, the front surface or the rear surface of the flat-screen TV can be directed toward the operator through simple operation, so that the dismantling operation for the flat-screen TV can be efficiently performed. In addition, no remarkable impact is applied to the flat-screen TV in inversion, whereby glass used for a display of the flat-screen TV can be prevented from cracking. If the flat-screen TV includes a fluorescent tube employing mercury and the fluorescent tube is by any chance broken, the mercury can be prevented from leaking into the operation environment.

The dismantling apparatus for a flat-screen TV according to the present invention preferably further includes a transporter for the flat-screen TV. FIG. 1 shows an example provided with a transporter 5 for transporting the flat-screen TV, for feeding the flat-screen TV to aforementioned inclined workbench 2, for feeding the same from inclined workbench 2 to horizontal workbench 3 and for feeding the same from horizontal workbench 3 to evacuation system 4 respectively. Transporter 5 can be implemented by a proper well-known means such as a belt conveyor, a roller conveyor or the like, for example.

<Dismantling Method for Flat-Screen TV>

The present invention also provides a method of dismantling a flat-screen TV. The dismantling method for a flat-screen TV according to the present invention can be preferably carried out with the aforementioned dismantling apparatus for a flat-screen TV according to the present invention. The dismantling method for a flat-screen TV according to the present invention includes the steps of detaching a cabinet and a control board in a state inclining the flat-screen TV and dismantling a flat-screen panel module in a state horizontalizing the flat-screen TV. In this case, the dismantling method preferably further includes a step of dismantling a backlight chassis assembly of the flat-screen panel module loaded with a fluorescent tube. The present invention further provides a dismantling method for a flat-screen TV including the steps of detaching a cabinet and a control board in a state horizontalizing the flat-screen TV and dismantling a flat-screen panel module under evacuation. These dismantling methods for a flat-screen TV according to the present invention can be suitably applied to dismantlement of a liquid crystal TV or a plasma TV, as hereinafter described in detail.

Figure 7:
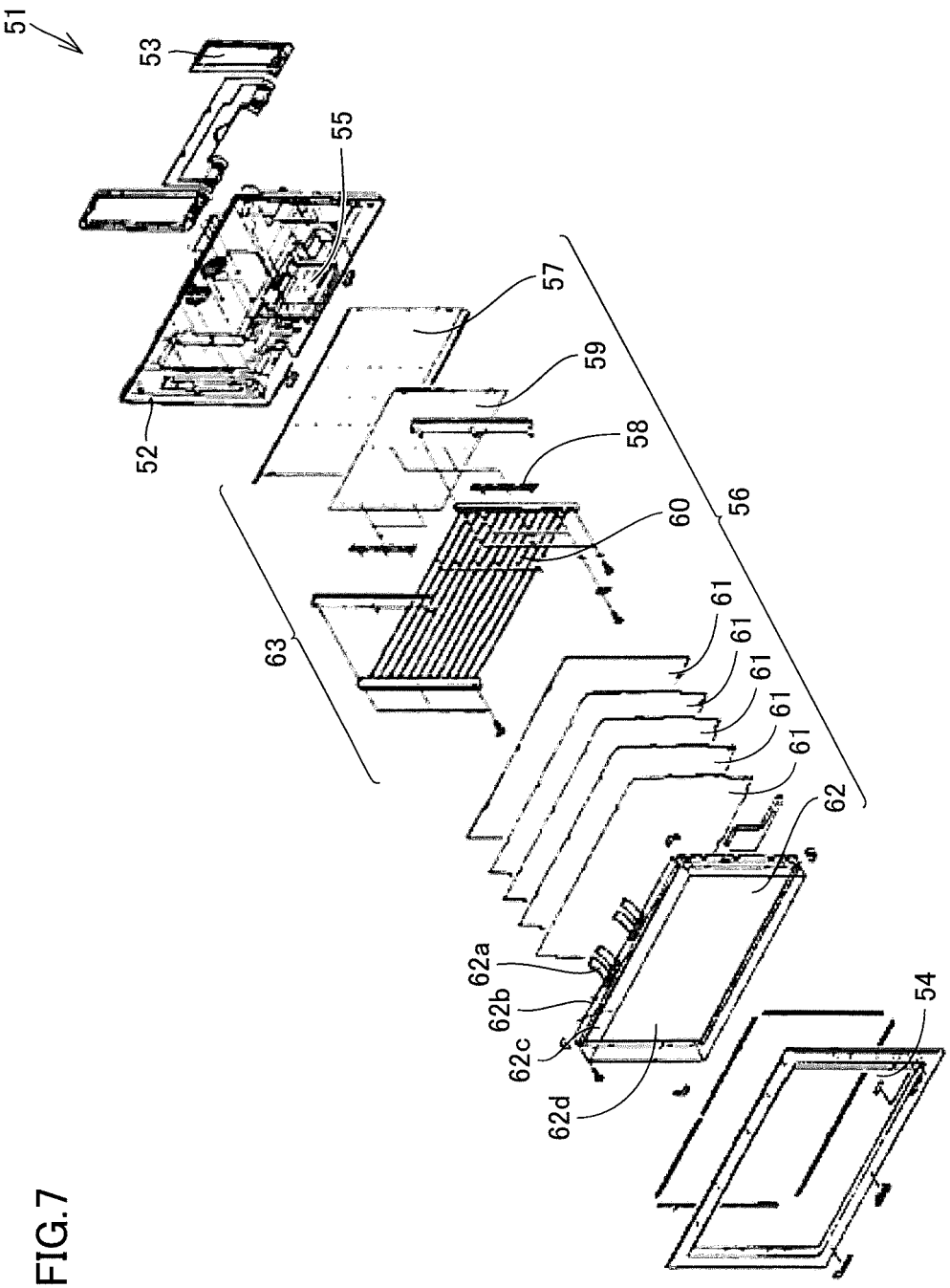
FIG. 7 is a diagram schematically showing a direct backlight type liquid crystal TV 51 as a preferred example of a flat-screen TV suitably subjectable to a dismantling method according to the present invention.

FIG. 7 is a diagram schematically showing a direct backlight liquid crystal TV 51 as a preferred example of a flat-screen TV suitably subjectable to the dismantling method according to the present invention. If the flat-screen TV is direct backlight liquid crystal TV 51, the same generally includes a rear cabinet 52, a stand 53, a front cabinet 54, a control board 55 and a flat-screen panel module 56, as shown in FIG. 7. Rear cabinet 52, stand 53 and control board 55 are arranged on the rear surface side of the flat-screen TV with respect to flat-screen panel module 56, while front cabinet 54 is arranged on the surface side of the flat-screen TV with respect to flat-screen panel module 56.

Flat-screen panel module 56 includes a backlight chassis assembly 63 and a flat-screen panel unit 62 (constituted of a liquid crystal driver substrate 62a, a plastic case 62b, a bezel 62c, panel glass 62d and the like). Further, backlight chassis assembly 63 includes a backlight chassis 57, clips 58, a reflecting sheet 59, fluorescent tubes 60 and optical sheets 61 (constituted of a prism sheet, a diffusion sheet and the like). The liquid crystal TV having such a structure is referred to as a "direct backlight liquid crystal TV", whose structure is frequently observed in a liquid crystal TV having a large screen size.

Figure 8:
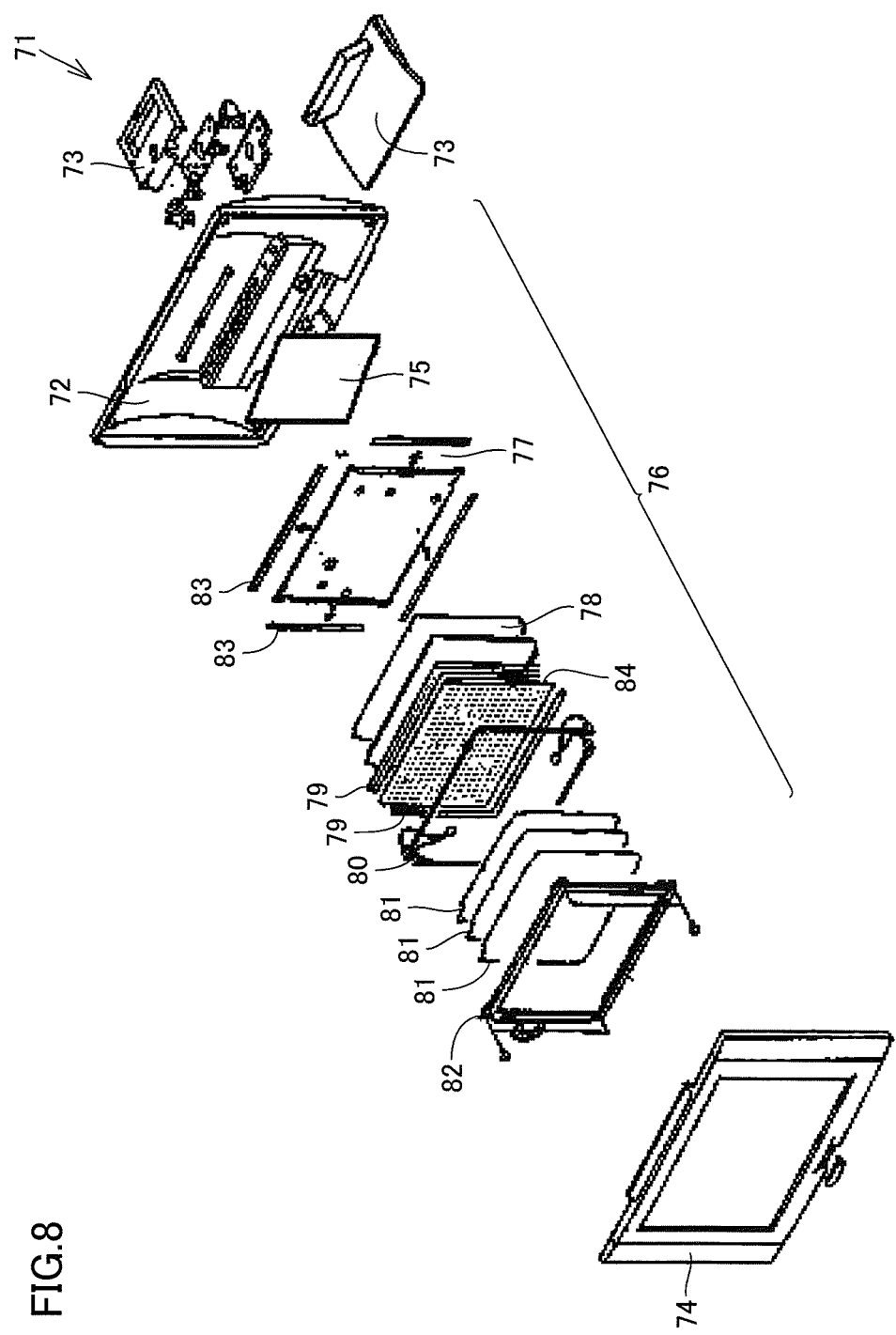
FIG. 8 is a diagram schematically showing an edge-lit liquid crystal TV 71 as a preferred example of the flat-screen TV suitably subjectable to the dismantling method according to the present invention.

FIG. 8 is a diagram schematically showing an edge-lit (edge light) liquid crystal TV 71 as another preferred example of the flat-screen TV suitably subjectable to the dismantling method according to the present invention. If the flat-screen TV is edge-lit liquid crystal TV 71, the same basically includes a rear cabinet 72, a stand 73, a front cabinet 74, as well as a control board 75 and a flat-screen panel module 76 arranged between the rear cabinet and the front cabinet in general, as shown in FIG. 8. Among these, flat-screen panel module 76 is constituted of a backlight chassis 77, a reflecting sheet 78, reflecting sheet covers 79, fluorescent tubes 80, optical sheets (constituted of a prism sheet, a diffusion sheet and the like) 81, a liquid crystal panel unit 82, reflecting mirrors 83 and a light guide 84. The liquid crystal TV having such a structure is referred to as an "edge-lit liquid crystal TV", whose structure is frequently observed in a liquid crystal TV having a small screen size.

In the present invention, the "front cabinet" denotes an outer case arranged on the surface side of the flat-screen TV. The "flat-screen panel module" in the liquid crystal TV denotes a component group at least including a flat-screen panel unit and a backlight chassis assembly integrally combined with the flat-screen panel unit. The "flat-screen panel unit" in the liquid crystal TV denotes a component group at least including panel glass into which a liquid crystal material, a transparent electrode etc. are sealed and a component integrally combined with this panel glass. The "backlight chassis assembly" denotes a component group at least including fluorescent tubes which are light sources arranged on the rear surface of the flat-screen panel unit and a component integrally combined with these fluorescent tubes.

Figure 9:
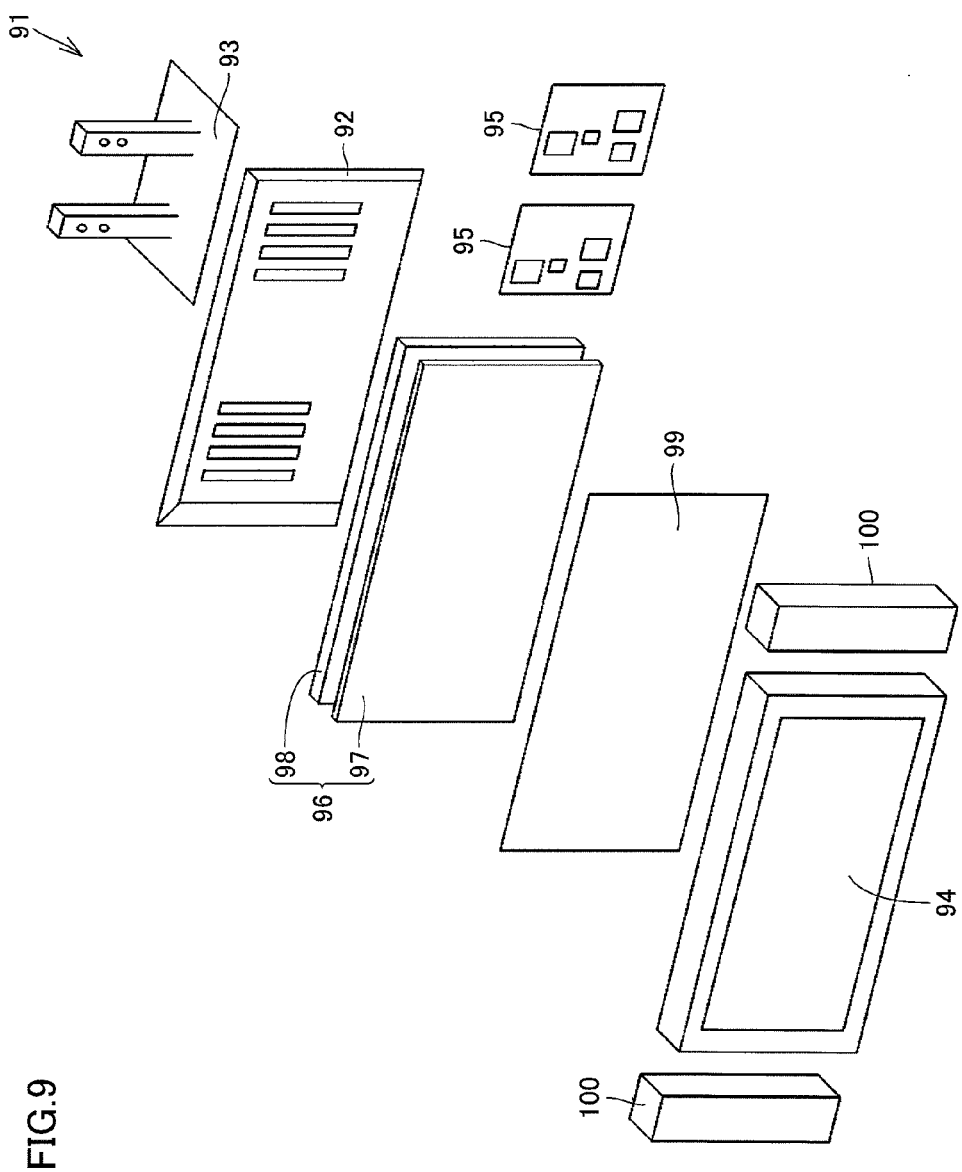
FIG. 9 is a diagram schematically showing a plasma TV 91 as a preferred example of the flat-screen TV suitably subjectable to the dismantling method according to the present invention.

FIG. 9 is a diagram schematically showing a plasma TV 91 as still another preferred example of the flat-screen TV suitably subjectable to the dismantling method according to the present invention. If the flat-screen TV is plasma TV 91, the same generally has a rear cabinet 92, a stand 93, a front cabinet 94, control boards 95 and a flat-screen panel module 96, as shown in FIG. 9. Rear cabinet 92, stand 93 and control board 95 are arranged on the rear surface side of the flat-screen TV with respect to flat-screen panel module 96, while front cabinet 94 is arranged on the surface side of the flat-screen TV with respect to flat-screen panel module 96.

The "flat-screen panel module" in the plasma TV denotes a component group including a flat-screen panel unit 97 and a module chassis 98. The "flat-screen panel unit" in the plasma TV denotes a component group at least including panel glass into which a fluorescent body and an electrode are sealed and a component integrally combined with this panel glass. The plasma TV further includes a front filter 99 and speakers 100. The plasma TV is loaded with no backlight chassis assembly.

[1] Dismantling Method for Large-Sized Liquid Crystal TV

FIG. 10 is a flow chart showing the dismantling method for a flat-screen TV according to the present invention in a case where the flat-screen TV is a large-sized liquid crystal TV such as direct backlight liquid crystal TV 51 shown in FIG. 7 whose screen size is at least 26 inches, for example, in a stepwise manner. Dismantlement of the flat-screen TV is now described in order with reference to FIGS. 7 and 10. A large-sized liquid crystal TV generally has the structure of the direct backlight liquid crystal TV shown in FIG. 7. A dismantling flow for the large-sized liquid crystal TV basically includes a step (step S1-2) of detaching a rear cabinet, a control board and a front cabinet, a step (step S1-3) of separating a flat-screen panel module into a backlight chassis assembly and a flat-screen panel unit and a step (step S1-4) of dismantling the backlight chassis assembly. The flow can further include a step (step S1-1) of detaching a stand and a step (step S1-5) of dismantling unit members. The dismantling method for a large-sized liquid crystal TV having the structure of a direct backlight liquid crystal TV is now described.

[1-1] Step of Detaching Stand

First, the stand is detached from the large-sized liquid crystal TV (step S1-1), FIG. 11 is a diagram schematically showing an example of carrying out the step (step S1-1) of detaching a stand in the dismantling method for a flat-screen TV according to the present invention with dismantling apparatus 1 shown in FIG. 1. In the case of employing dismantling apparatus 1 shown in FIG. 1, the stand is detached in a state placing a large-sized liquid crystal TV 500 on transporter 5, as shown in FIG. 11.

As a specific detaching method for the stand, screws fastening the body of the large-sized liquid crystal TV and the stand to each other are manually removed with an electric driver or the like, to detach the stand. The detached stand unit is dismantled in a step described later, so that metal, plastic etc. contained therein are recovered and recycled. In a case of applying a large-sized liquid crystal TV including no stand to the dismantling method in the present invention, this step is omitted.

[1-2] Step of Detaching Rear Cabinet, Control Board and Front Cabinet

Figure 12:
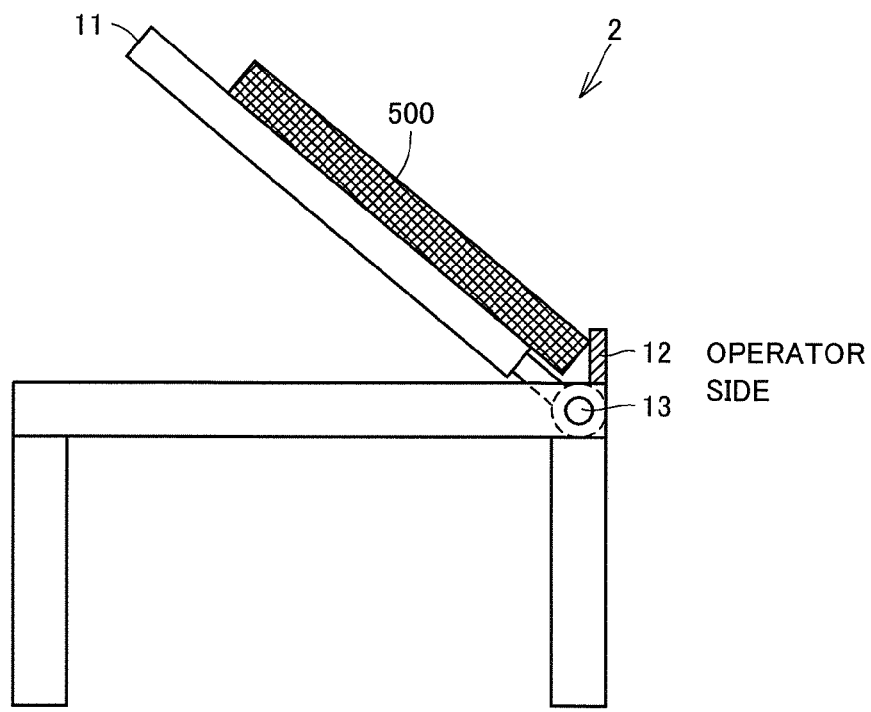
FIG. 12 is a diagram schematically showing an example of carrying out a step (step S1-2) of detaching a rear cabinet, a control board and a front cabinet in the dismantling method for a flat-screen TV according to the present invention with dismantling apparatus 1 shown in FIG. 1.

Then, a rear cabinet, a control board and a front cabinet are detached from the body of the large-sized liquid crystal TV (step S1-2). FIG. 12 is a diagram schematically showing an example of carrying out the step (step S1-2) of detaching a rear cabinet, a control board and a front cabinet in the dismantling method for a flat-screen TV according to the present invention with dismantling apparatus 1 shown in FIG. 1. This step is basically carried out by employing inclined workbench 2. By employing inclined workbench 2, large-sized liquid crystal TV 500 placed on receiving surface 11 is so inclined that the surface (rear surface) opposite to a display surface is directed toward the operator side as shown in FIG. 12, and the rear cabinet and the control board are detached from the large-sized liquid crystal TV in this state.

As a specific detaching method for the rear cabinet, screws, snap fits or the like fastening the rear cabinet and the front cabinet to each other are manually removed with an electric driver or the like, to detach the rear cabinet. The rear cabinet is fixed to the front cabinet with the screws from the rear surface side. Therefore, the large-sized liquid crystal TV is so inclined that the rear surface of the large-sized liquid crystal TV is directed toward the operator, whereby visibility of the screws is improved, and operation efficiency in the dismantlement with the electric driver or the like can be rendered excellent. The detached rear cabinet is separated every stuff, and recycled into the original stuff.

The dismantling method for a flat-screen TV according to the present invention may further include a dust removing step of removing grit, dust etc. accumulated therein from the large-sized liquid crystal TV in a state where the control board and the flat-screen panel module are exposed, after detaching the rear cabinet.

Then, the control board is detached from the body of the large-sized liquid crystal TV. As a specific detaching method for the control board, connectors connecting electrodes with each other are first removed, or a wire harness is removed by cutting the wire harness. Fastening components fixing the control board are manually removed, to detach the control board. When fixed with screws, for example, the screws are manually removed with an electric driver or the like, to detach the control board. The control board is fixed to the flat-screen panel module with the screws from the rear surface side of the large-sized liquid crystal TV. Therefore, the large-sized liquid crystal TV is so inclined that the rear surface is directed toward the operator, whereby visibility of the screws is improved, and operation efficiency in the dismantlement with the electric driver or the like can be rendered excellent. Treatment such as separation of a cover is performed on the recovered wire harness, so that metal such as copper is recycled. Further, metal such as copper is recycled from the detached control board. If the control board is unified with a frame or the like and recovered as a substrate unit, the same is further dismantled in a step described later to be thereafter recycled every stuff.

In a case of a large-sized liquid crystal TV loaded with a speaker, the speaker is detached. As a specific detaching method, screws fastening the speaker to the cabinet of the body etc. are detached. The recovered speaker is separated every stuff, and recycled. If the speaker is built into a speaker box or the like and unified, the speaker is detached along with the speaker unit. The detached speaker unit is dismantled in a step described later, and recycled every stuff. The detachment of the speaker, shown after the detachment of the control board, may alternatively be carried out after the detachment of the stand, after the detachment of the rear cabinet or the like, in response to the structure of the flat-screen TV.

Then, the front cabinet is detached. At this time, the inclined workbench is first employed similarly to the case shown in FIG. 12, the large-sized liquid crystal TV is so inclined that the rear surface is directed toward the operator side, and fastening members fixing the front cabinet and the flat-screen panel module to each other are detached from the large-sized liquid crystal TV in this state. As a specific detaching method, screws, snap fits or the like fixing the front cabinet and the flat-screen panel module to each other are manually removed. The front cabinet is fixed to the flat-screen panel module with the screws, the snap fits or the like from the rear surface side. Therefore, the large-sized liquid crystal TV is so inclined that the rear surface is directed toward the operator, whereby visibility of the screws is improved, and operation efficiency in the dismantlement with an electric driver or the like can be rendered excellent. If workability is improved in an uninclined horizontal state, the fastening members may be detached by shifting the large-sized liquid crystal TV to the horizontal state without employing the inclining function of the inclined workbench, depending on the structure of the large-sized liquid crystal TV.

Thereafter the inversion function of the inclined workbench 2 is employed to invert the large-sized liquid crystal TV, thereby obtaining a state where the large-sized liquid crystal TV is placed on the receiving surface while the display surface (front surface) is directed upward. In this state, the front cabinet is separated from the flat-screen panel module while leaving the flat-screen panel module on the receiving surface. The separated front cabinet is separated every stuff, and recycled into the original stuff. If the front cabinet is unified with a speaker net or the like, the front cabinet is further dismantled in a step described later. In this stage, detachment of the respective members on the outer side of the flat-screen panel module is completed, to result in a state of only the flat-screen panel module. If the flat-screen panel module is lightweight, the flat-screen panel module may be inverted after raising the flat-screen panel module from the receiving surface, recovering the front cabinet remaining on the receiving surface and separating the front cabinet and the flat-screen panel module from each other, before inverting the large-sized liquid crystal TV.

[1-3] Step of Dismantling Flat-Screen Panel Module

Figure 13:
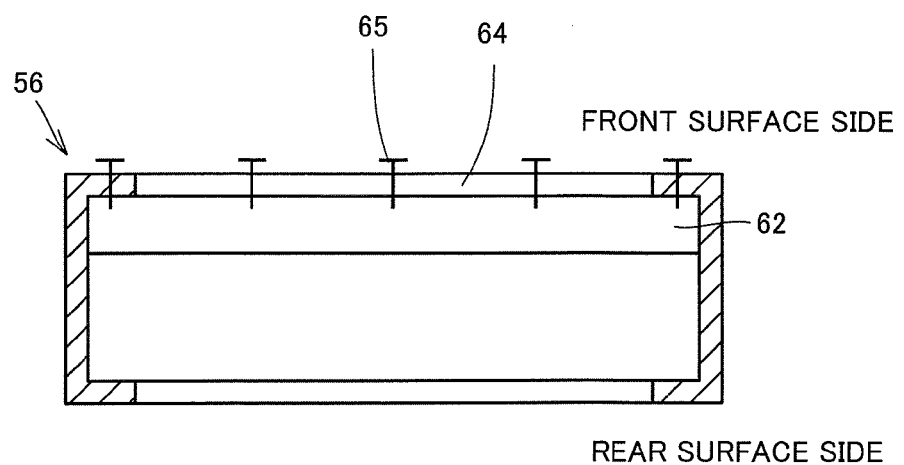
FIG. 13 is a sectional view showing an example of a flat-screen panel module 56 subjected to a step (step S1-3) of dismantling a flat-screen panel module in the dismantling method for a flat-screen TV according to the present invention.

Then, the flat-screen panel module is dismantled (step S1-3). This step is basically carried out by employing the horizontal workbench. FIG. 13 is a sectional view showing flat-screen panel module 56 subjected to the step shown in the step S1-3 in FIG. 10. The structure of flat-screen panel module 56 is first described with reference to FIG. 13. The backlight chassis assembly of flat-screen panel module 56 is combined with flat-screen panel unit 62 from the rear surface side of the large-sized liquid crystal TV. A frame-type bezel 64 is arranged to surround side portions of the backlight chassis assembly and flat-screen panel unit 62. The bezel is fixed to flat-screen panel unit 62 with screws 65, snap fits or the like from the surface side or the side surfaces of the large-sized liquid crystal TV.

Figure 14:
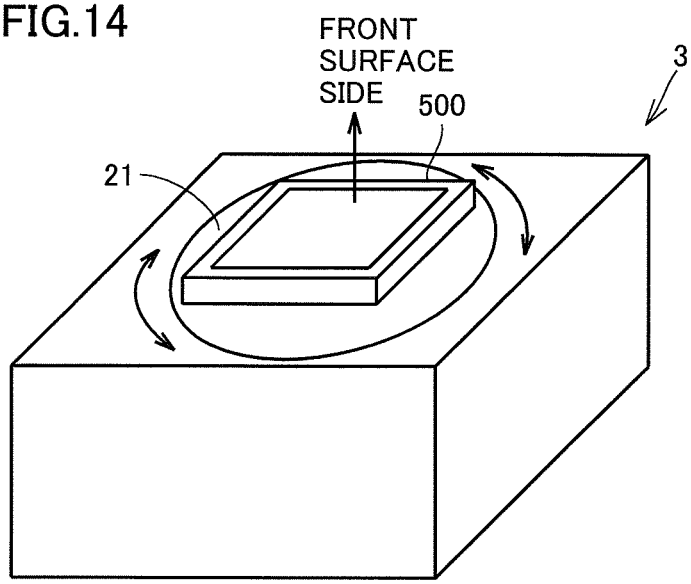
FIG. 14 is a diagram schematically showing an example of carrying out the step (step S1-3) of dismantling the flat-screen panel module in the dismantling method for a flat-screen TV according to the present invention with dismantling apparatus 1 shown in FIG. 1.

FIG. 14 is a diagram schematically showing an example of carrying out the step (step S1-3) of dismantling a flat-screen panel module in the dismantling method for a flat-screen TV according to the present invention with dismantling apparatus 1 shown in FIG. 1. In this step, flat-screen panel module 56 is dismantled. More specifically, flat-screen panel module 56 is separated into backlight chassis assembly 63 and flat-screen panel unit 62. At this time, large-sized liquid crystal TV 500 is first placed on the receiving surface of horizontal workbench 3 so that the surface side is directed upward as shown in FIG. 14, and the bezel is detached from large-sized liquid crystal TV 500 in this state. As hereinabove described, the bezel is fixed with the screws, the snap fits or the like from the surface side or the side surfaces. Therefore, large-sized liquid crystal TV 500 is so placed that the surface side is directed upward, whereby the positions of the screws, the snap fits or the like can be quickly recognized, and the dismantling time can be reduced. At this time, the fastening components to be detached are moved to the front side of the operator with a rotating mechanism, whereby the operation efficiency is further improved. In the inclined state as up to the previous step, the screws on the side surfaces are hard to detach. In a state inclined to be separated into the members, the separated members slip down on the stage, to deteriorate the workability.

Further, the posture of the operator can be kept, and the operation efficiency can be improved. Thereafter the flat-screen panel unit is separated from the backlight chassis assembly while leaving the backlight chassis assembly on the receiving surface. The separated flat-screen panel unit is further separated into a liquid crystal driver substrate, a plastic case and panel glass. The flat-screen panel unit can be separated without breaking the panel glass, due to the use of the dismantling apparatus. Therefore, it is also possible to remove a thin film, recover metal from metal powder and further crush glass to recycle the same as a glass material after cutting the panel glass and recovering liquid crystals.

[1-4] Step of Dismantling Backlight Chassis Assembly

Figure 15:
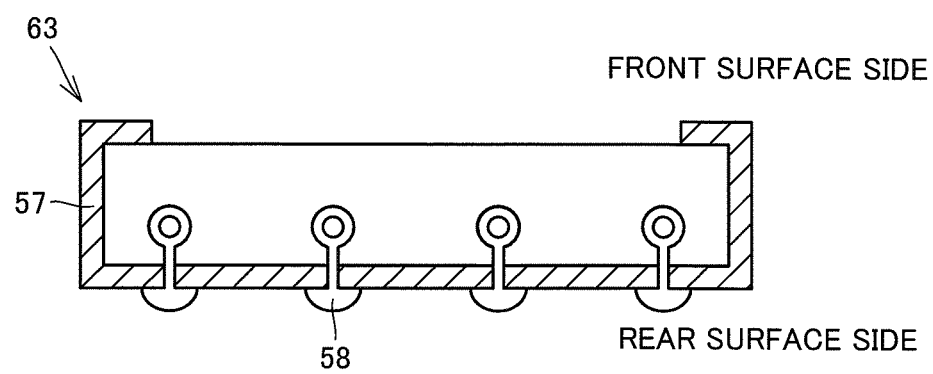
FIG. 15 is a sectional view showing a backlight chassis assembly 63 subjected to a step of dismantling a backlight chassis assembly.

Then, the backlight chassis assembly is dismantled (step S1-4). This step is basically carried out under an evacuation mechanism. FIG. 15 is a sectional view showing backlight chassis assembly 63 subjected to the step of dismantling a backlight chassis assembly. First, the structure of backlight chassis assembly 63 is described with reference to FIG. 15. The backlight chassis is in the form of a box opening on the surface side of the large-sized liquid crystal TV, in order to extract light emitted from the fluorescent tubes toward the flat-screen panel unit. The reflecting sheet, the fluorescent tubes and the optical sheets are arranged inside the backlight chassis. The clips as fluorescent tube holding members are inserted into the backlight chassis from the rear surface side of the large-sized liquid crystal TV. With these clips, the fluorescent tubes are held in the backlight chassis.

Figure 16:
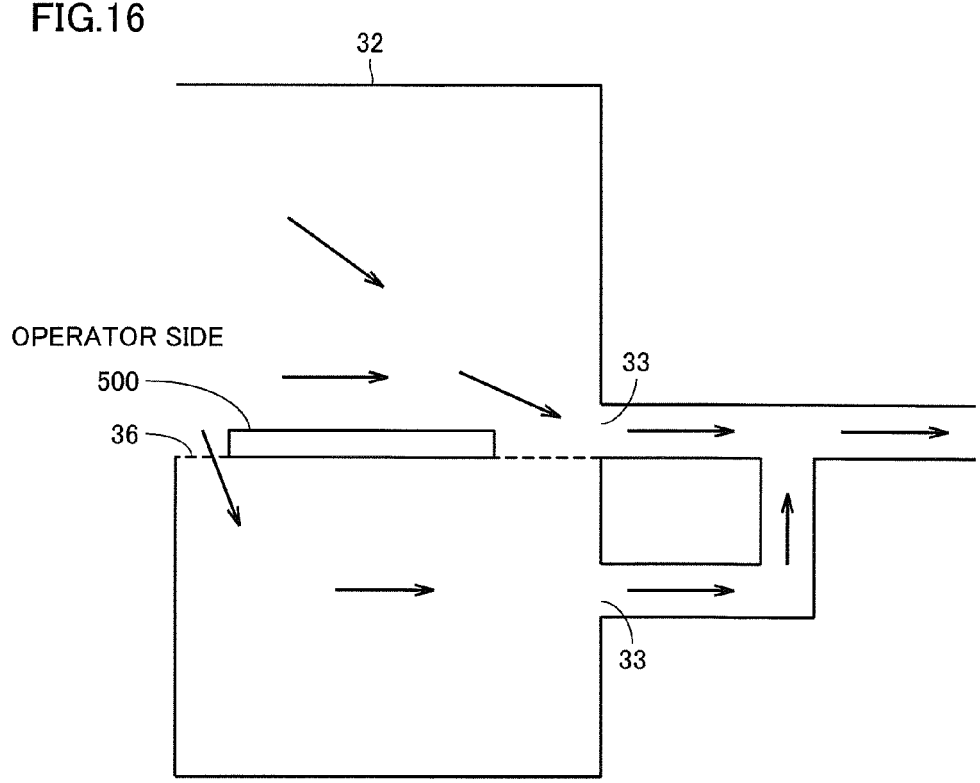
FIG. 16 is a diagram schematically showing an example of carrying out the step (step S1-4) of dismantling the backlight chassis assembly in the dismantling method for a flat-screen TV according to the present invention with dismantling apparatus 1 shown in FIG. 1.

FIG. 16 is a diagram schematically showing an example of carrying out the step (step S1-4) of dismantling a backlight chassis assembly in the dismantling method for a flat-screen TV according to the present invention with dismantling apparatus 1 shown in FIG. 1. While backlight chassis assembly 63 is dismantled in this step, this step is executed by setting large-sized liquid crystal TV 500 under the evacuation system at this time as shown in FIG. 16, in consideration of health damage caused by mercury. As a specific method of dismantling backlight chassis assembly 63, stop portions (portions exposed to the outer side of the backlight chassis) of the clips are cut from the rear surface with a cutting means such as a nipper or a cutting tool such as a cutter, for example, to detach the clips. Alternatively, the stop portions of the clips may be polished/removed with a polishing means such as a grinder of a blast. Thus, the fluorescent tubes are released from fixation, and drops onto the receiving surface. The clips are detached from the fluorescent tubes taken out from the backlight chassis, and the fluorescent tubes are recovered into the vessel.

The fluorescent tubes may alternatively be recovered into the vessel as such, without detaching the clips. In a case of a large-sized liquid crystal TV having such a structure that clips cannot be cut from the rear surface, the fluorescent tubes are manually grabbed from the surface and detached from the clips.

If by any chance the fluorescent tubes are broken, the same are sealed in the closed vessel. At this time, the fluorescent tubes are preferably sealed under vessel evacuation system 41 shown in FIG. 6. Thus, the operator can be prevented from sucking mercury diffusing from the broken fluorescent tubes in opening/closing of the closed vessel. Proper treatment is so performed on the recovered fluorescent tubes that mercury sealed into the fluorescent tubes and glass can be recovered.

[1-5] Step of Dismantling Unit Members

The recovered members (unit members) such as the stand unit, the substrate unit, the speaker unit, the front cabinet etc. are further dismantled (step S1-5). This step is basically carried out by employing horizontal workbench 3. In a case of a large-sized liquid crystal TV not loaded with the stand unit, the substrate unit, the speaker unit, the front cabinet etc., this step can be omitted. Also in a case where the large-sized liquid crystal TV is loaded with unit members recyclable as such with no dismantlement, this step can be omitted.

As a specific method of dismantling the unit members such as the stand unit, the speaker unit etc., a method of dismantling the unit members by manually removing screws, caulkings etc. fastening the members with an electric driver or the like can be listed. The recovered respective members are separated every stuff, and recycled as metal, plastic etc.

While this step has been shown after the step of dismantling the backlight chassis assembly in the example shown in FIG. 10, the order of the step is not restricted to this, but the step may be carried out either after the step S1-2 or after the step S1-3, or may be carried out simultaneously with the step S1-2, simultaneously with the step S1-3 or simultaneously with the step S1-4, so far as the unit members have been detached.

[2] Dismantling Method for Medium/Small-Sized Liquid Crystal TV

Figure 17:
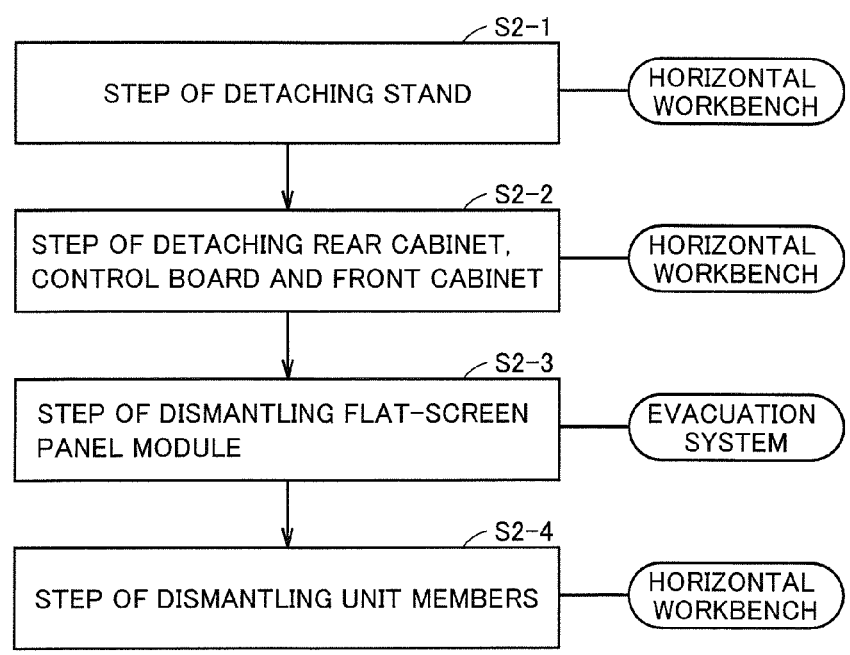
FIG. 17 is a flow chart showing the dismantling method for a flat-screen TV according to the present invention in a case where the flat-screen TV is a medium/small-sized liquid crystal TV such as edge-lit liquid crystal TV 71 whose screen size is less than 26 inches, for example, in a stepwise manner.

A dismantling method for a medium/small-sized liquid crystal TV whose screen size is less than 26 inches, for example, is now described. FIG. 17 is a flow chart showing the dismantling method for a flat-screen TV according to the present invention in a case where the flat-screen TV is a medium/small-sized liquid crystal TV such as edge-lit liquid crystal TV 71 shown in FIG. 8, for example, whose screen size is less than 26 inches, for example. In the medium/small-sized liquid crystal TV, the systems of the direct backlight liquid crystal TV and the edge-lit liquid crystal TV are mixedly present. The dismantling method for a medium/small-sized liquid crystal TV basically includes a step (step S2-2) of detaching a rear cabinet, a control board and a front cabinet and a step (step S2-3) of dismantling a flat-screen panel module. The dismantling method may further include a step (step S2-1) of detaching a stand and a step (step S2-4) of dismantling unit members. The dismantling method for a medium/small-sized liquid crystal TV is now described in detail with reference to FIGS. 8 and 17.

[2-1] Step of Detaching Stand

Figure 18:
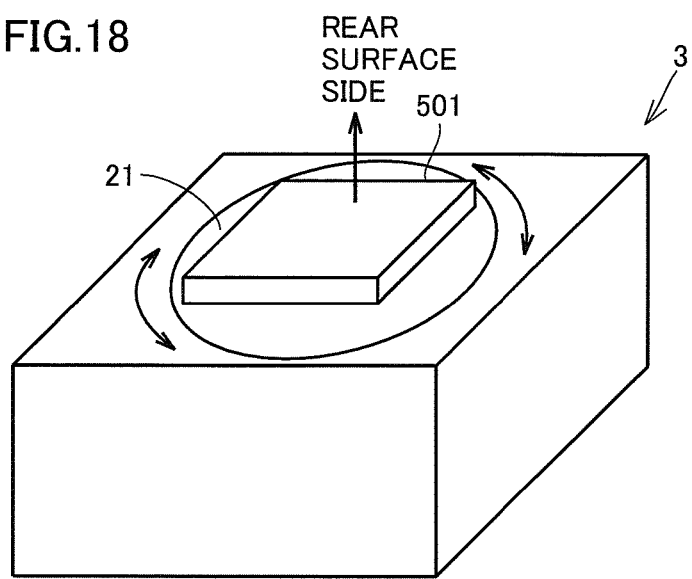
FIG. 18 is a diagram schematically showing an example of carrying out a step (step S2-1) of detaching a rear cabinet, a control board and a front cabinet in the dismantling method for a flat-screen TV according to the present invention with dismantling apparatus 1 shown in FIG. 1.

First, the stand is detached from the medium/small-sized liquid crystal TV (step S2-1). FIG. 18 is a diagram schematically showing an example of carrying out the step (S2-1) of detaching a rear cabinet, a control board and a front cabinet in the dismantling method for a flat-screen TV according to the present invention with dismantling apparatus 1 shown in FIG. 1. In this step, operation is performed in a state placing a medium/small-sized liquid crystal TV 501 on the receiving surface of horizontal workbench 3 as shown in FIG. 18, for example. Thus, medium/small-sized liquid crystal TV 501 having a small size can be dismantled in a stable state without reducing visibility of fastening components, and fastening component detaching operation efficiency with an electric driver or the like is rendered excellent. Further, the fastening components to be detached are moved to the front side of the operator with a rotating mechanism at this time, so that the operation efficiency is further improved.

As a specific detaching method for the stand, screws fastening the body of the medium/small-sized liquid crystal TV and the stand to each other are manually removed with an electric driver or the like, thereby detaching the stand. The detached stand unit is dismantled in a step described later, so that metal, plastic etc. contained therein are recovered and recycled. In a case of applying a medium/small-sized liquid crystal TV including no stand to the dismantling method according to the present invention, the detachment of the stand is omitted.

[2-2] Step of Detaching Rear Cabinet, Control Board and Front Cabinet

Then, the rear cabinet, the control board and the front cabinet are detached (step S2-2). At this time, operation is performed in a state placing the medium/small-sized liquid crystal TV on the receiving surface on the horizontal workbench, similarly to the aforementioned step S2-1. Thus, the medium/small-sized liquid crystal TV having a small size can be dismantled in a stable state without reducing visibility of fastening components, and efficiency in the detaching operation for the fastening components with an electric driver or the like is rendered excellent. At this time, the fastening components to be detached are moved to the front side of the operator with a rotating mechanism, whereby the operation efficiency is further improved.

As a specific detaching method for the rear cabinet and the control board, screws, snap fits or the like fastening the rear cabinet and the front cabinet to each other are manually removed, to detach the rear cabinet. The detached rear cabinet is separated every stuff, and recycled into the original stuff.

The dismantling method for a flat-screen TV according to the present invention may further include a dust removing step of removing grit, dust etc. accumulated therein from the medium/small-sized liquid crystal TV in a state where the control board and the flat-screen panel module are exposed, after detaching the rear cabinet.

Then, the control board is detached from the body of the medium/small-sized liquid crystal TV. As a specific detaching method for the control board, connectors connecting electrodes with each other are first removed, or a wire harness is removed by cutting the wire harness. Fastening components fixing the control board are manually removed, to detach the control board. When fixed with screws, for example, the screws are manually removed with an electric driver or the like, to detach the control board. Treatment such as separation of a cover is performed on the recovered wire harness, so that metal such as copper is recycled. Further, metal such as copper is recycled from the detached control board. If the control board is unified with a frame or the like and recovered as s substrate unit, the same is further dismantled in a step described later to be thereafter recycled every stuff.

In a case of a medium/small-sized liquid crystal TV loaded with a speaker, the speaker is detached. As a specific detaching method, screws fastening the speaker to the cabinet of the body etc. are detached. The recovered speaker is separated every stuff, and recycled. If the speaker is built into a speaker box or the like and unified, the speaker is detached along with the speaker unit. The detached speaker unit is dismantled in a step described later, and recycled every stuff.

Then, the front cabinet is detached. As a specific method, screws, snap fits or the like fixing the front cabinet and the flat-screen panel module to each other are manually removed. The front cabinet is fixed to the flat-screen panel module with the screws, the snap fits or the like from the rear surface side. The separated front cabinet is separated every stuff, and recycled into the original stuff.

[2-3] Step of Dismantling Flat-Screen Panel Module

In this step, the flat-screen panel module is first separated into the backlight chassis assembly and the flat-screen panel unit. At this time, the medium/small-sized liquid crystal TV is first so placed on the receiving surface of the horizontal workbench that the surface is directed upward, and the bezel is detached from the medium/small-sized liquid crystal TV in this state. As hereinabove described, the bezel is fixed with the screws, the snap fits or the like from the front surface side or the side surfaces. Therefore, the medium/small-sized liquid crystal TV is so placed that the front surface side is directed upward, whereby the positions of the screws, the snap fits or the like can be quickly recognized, and the dismantling time can be reduced. Further, the step of dismantling the flat-screen panel module is more preferably carried out under the evacuation system, similarly to that shown in FIG. 16. Dismantlement of a TV having a small size includes a large number of fine workings of detaching small components. Further, the size of the flat-screen panel module is so small that the fluorescent tubes are exposed as the dismantlement progresses and the components are detached, to result in a possibility of breaking the fluorescent tubes. In addition, the flat-screen panel module is so small that the fluorescent tubes are easily touched by a tool or the like and easily broken. The operation is so performed under the evacuation system that the operator can be prevented from health damage if by any chance the fluorescent tubes are broken.

Thereafter the flat-screen panel unit is separated from the backlight chassis assembly while leaving the backlight chassis assembly on the receiving surface. The separated flat-screen panel unit is further dismantled into a liquid crystal driver substrate, a plastic case and panel glass. The flat-screen panel unit can be separated without breaking the panel glass, due to the use of the dismantling apparatus. Therefore, it is also possible to remove a thin film, recover metal from metal powder and further crush glass to recycle the same as a grindstone alternative by nonferrous refining after cutting the panel glass and recovering liquid crystals.

Then, the backlight chassis assembly is dismantled. At this time, the step is executed under the evacuation system, in consideration of health damage caused by mercury.

Figure 19:
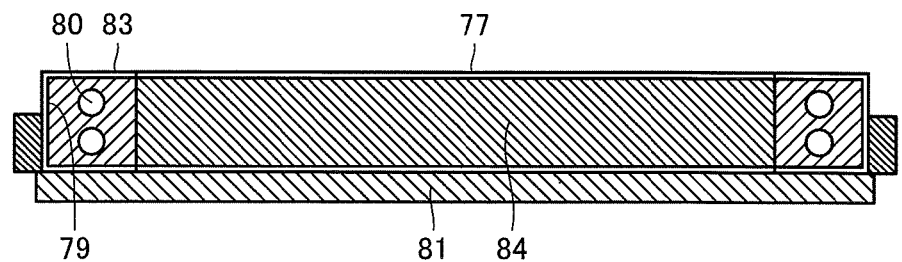
FIG. 19 is a sectional view showing an example of a backlight chassis assembly subjected to a step (step S2-2) of dismantling a flat-screen panel module in the dismantling method for a flat-screen TV according to the present invention.

While the above description of the example of the large-sized liquid crystal TV has been made mainly with reference to the case of dismantling the direct backlight liquid crystal TV of the example shown in FIG. 7, the dismantling method and the dismantling apparatus for a flat-screen TV according to the present invention can also be suitably applied to dismantlement of the edge-lit liquid crystal TV of the example shown in FIG. 8, as a matter of course. A dismantling method for a backlight chassis assembly of a direct backlight medium/small-sized liquid crystal TV is similar to the aforementioned step S1-4. A dismantling method for the edge-lit liquid crystal TV is now described. FIG. 19 is a diagram schematically showing a case of applying the dismantling step for fluorescent tubes in the dismantling method for a liquid crystal TV according to the present invention to the edge-lit liquid crystal display of the example shown in FIG. 8.

In the case of the edge-lit liquid crystal TV shown in FIG. 8, the backlight chassis assembly is constituted of backlight chassis 77, reflecting sheet 78, reflecting sheet covers 79, fluorescent tubes 80, reflecting mirrors 83 and light guide 84, for example. In the case of the backlight chassis assembly obtained by dismantling the edge-lit liquid crystal TV shown in FIG. 8, the fluorescent tubes are in such a state that connector portions of the fluorescent tubes are held in clearances between the reflecting sheet covers, the reflecting mirrors and the backlight chassis, and hence such a possibility that the backlight is broken during the dismantling operation is low as compared with the case of the direct backlight liquid crystal TV shown in FIG. 7.

Figure 20:
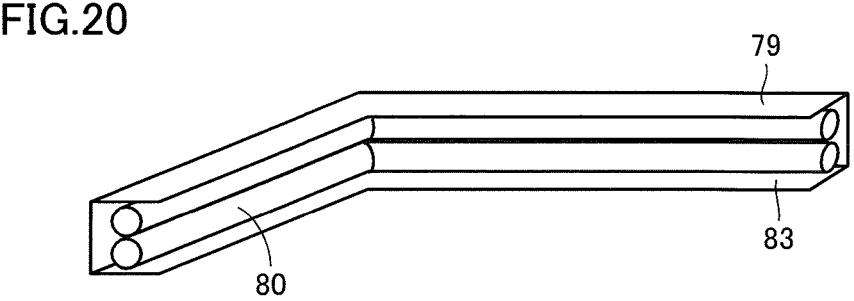
FIG. 20 is a sectional view showing an example of a structure constituted of fluorescent tubes, reflecting mirrors and reflecting sheet covers, separated in the step (step S2-2) of dismantling the flat-screen panel module in the dismantling method for a flat-screen TV according to the present invention.

In a case of detaching the fluorescent tubes from the backlight chassis assembly obtained by dismantling the edge-lit liquid crystal TV, therefore, the backlight chassis assembly can be separated into the light guide, the backlight chassis and a structure (see FIG. 20) constituted of the fluorescent tubes, the reflecting mirrors and the reflecting sheet covers by sealing openings of the backlight chassis assembly with sheet materials, the optical sheets or the reflecting sheet (sheet material 81 in the example shown in FIG. 19) as described above, placing the backlight chassis assembly so that the openings thereof are arranged downward, cutting a harness, thereafter releasing the connectors from the holding and removing adhesive tapes. This structure constituted of the fluorescent tubes, the reflecting mirrors and the reflecting sheet covers is so thrown into the vessel as such, for example, that the fluorescent tubes can be recovered while taking a sufficient mercury countermeasure. After separating the aforementioned structure into the respective components of the fluorescent tubes, the reflecting mirrors and the reflecting sheet covers, only the fluorescent tubes may be thrown into the aforementioned vessel to be recovered, as a matter of course.

[2-4] Step of Dismantling Unit Members

The recovered unit members such as the stand unit, the substrate unit, the speaker unit, the front cabinet etc. are further dismantled (step S2-4). This step is basically carried out with the horizontal workbench. In a case of a large-sized liquid crystal TV not loaded with the stand unit, the substrate unit, the speaker unit, the front cabinet etc., this step can be omitted. Also in a case loaded with unit members recyclable as such without dismantlement, this step can be omitted.

As a specific method of dismantling the unit members such as the stand unit, the speaker unit etc., screws, caulkings etc. fastening the members are manually removed with an electric driver or the like, to dismantle the unit members. The recovered respective members are separated every stuff, and recycled as metal, plastic etc.

While this step has been shown after the step of dismantling the flat-screen panel module in the example shown in FIG. 17, the order of the step is not restricted to this, but the step may be carried out after the step S2-2, or may be carried out simultaneously with the step S2-2 or simultaneously with the step S2-3, so far as the unit members have been detached.

[3] Dismantling Method for Plasma TV

Figure 21:
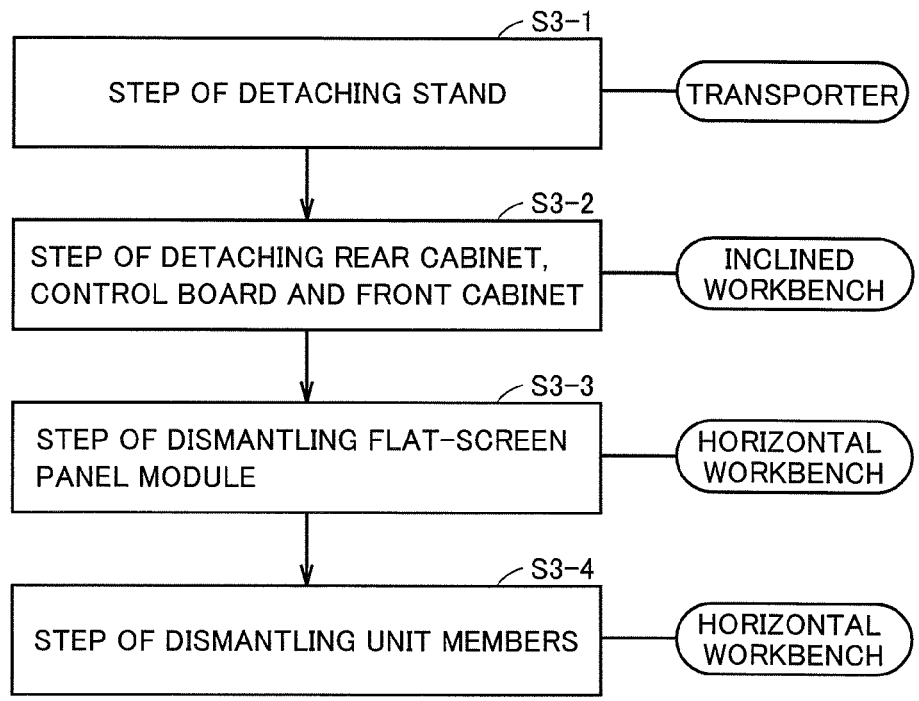
FIG. 21 is a flow chart showing the dismantling method for a flat-screen TV according to the present invention in a case where the flat-screen TV is plasma TV 91.

A dismantling method for a plasma TV is now described in detail. FIG. 21 is a flow chart showing the dismantling method for a flat-screen TV according to the present invention in a case where the flat-screen TV is plasma TV 91 shown in FIG. 9 in a stepwise manner. The plasma TV is of a spontaneous emission type and loaded with no fluorescent tubes, and hence the same requires no evacuation system. The screen size of a plasma TV is at least 30 inches in general. The dismantling method for a plasma TV basically includes a step (step S3-2) of detaching a rear cabinet, a control board and a front cabinet and a step (step S3-3) of dismantling a flat-screen panel module. The dismantling method can further include a step (step S3-1) of detaching a stand and a step (S3-4) of dismantling unit members. The dismantling method for a plasma TV is now described in detail.

[3-1] Step of Detaching Stand

The stand is detached from the plasma TV (step S3-1). At this time, the stand is detached in a state placing the plasma TV on the transporter, similarly to FIG. 7.

As a specific detaching method for the stand, screws fastening the body of the plasma TV and the stand to each other are manually removed with an electric driver or the like, to detach the stand. The detached stand unit is dismantled in a step described later, so that metal, plastic etc. contained therein are recovered and recycled. In a case of applying a plasma TV including no stand to the dismantling method according to the present invention, this step is omitted.

[3-2] Step of Detaching Rear Cabinet, Control Board and Front Cabinet

Then, the rear cabinet, the control board and the front cabinet are detached from the body of the plasma TV (step S3-2). At this time, the plasma TV is placed on the receiving surface of the inclined workbench, the plasma TV is so inclined that the rear surface is directed toward the operator side, and the rear cabinet and the control board are detached from the plasma TV in this state, similarly to the case of the large-sized liquid crystal TV, as shown in FIG. 12.

As a specific detaching method for the rear cabinet, screws, snap fits or the like fastening the rear cabinet and the front cabinet to each other are manually removed, to detach the rear cabinet. The rear cabinet is fixed to the front cabinet with the screws from the rear surface side. Therefore, the plasma TV is so inclined that the rear surface of the plasma TV is directed toward the operator, whereby visibility of the screws is improved, and operation efficiency in the dismantlement with an electric driver or the like can be rendered excellent. The detached rear cabinet is separated every stuff, and recycled into the original stuff.

The dismantling method for a flat-screen TV according to the present invention may further include a dust removing step of removing grit, dust etc. accumulated therein from the plasma TV in a state where the control substrate and the flat-screen panel module are exposed after detaching the rear cabinet.

Then, the control board is detached from the body of the plasma TV. As a specific detaching method for the control board, connectors connecting electrodes with each other are first removed, or a wire harness is removed by cutting the wire harness. Fastening components fixing the control board are manually removed, to detach the control board. When fixed with screws, for example, the screws are manually removed with an electric driver or the like, to detach the control board. The control board is fixed to the flat-screen panel module with the screws from the rear surface side of the plasma TV. Therefore, the plasma TV is so inclined that the rear surface is directed toward the operator, whereby visibility of the screws is improved, and operation efficiency in the dismantlement with the electric driver or the like can be rendered excellent. Treatment such as separation of a cover is performed on the recovered wire harness, so that metal such as copper is recycled. Further, metal such as copper is recycled from the detached control board. If the control board is unified with a frame or the like and recovered as a substrate unit, the same is further dismantled in a step described later to be recycled every stuff.

In a case of a plasma TV loaded with a speaker, the speaker is detached. As a specific detaching method, screws fastening the speaker to the cabinet of the body or the like are detached. The recovered speaker is separated every stuff, and recycled. If the speaker is built into a speaker box or the like and unified, the speaker is detached along with the speaker unit. The detached speaker unit is dismantled in a step described later, and recycled every stuff. The detachment of the speaker, shown after the detachment of the control board, may alternatively be carried out after the detachment of the stand, after the detachment of the rear cabinet or the like, in response to the structure of the flat-screen TV.

Then, the front cabinet is detached. At this time, the plasma TV is first so inclined that the rear surface is directed toward the operator side, and fastening members fixing the front cabinet and the flat-screen panel module to each other are detached from the plasma TV in this state, similarly to that shown in FIG. 12. As a specific method, screws, snap fits or the like fixing the front cabinet and the flat-screen panel module to each other are manually removed. The front cabinet is fixed to the flat-screen panel module with the screws, the snap fits or the like from the rear surface side. Therefore, the plasma TV is so inclined that the rear surface side is directed toward the operator, whereby visibility of the screws is improved, and operation efficiency in the dismantlement with an electric driver or the like can be rendered excellent. If the visibility of the fastening components is excellent, the fastening components may be detached in an uninclined horizontal state.

Thereafter the plasma TV is inverted, so that the plasma TV is placed on the receiving surface in a state where the surface side is directed upward. In this state, the front cabinet is separated from the flat-screen panel module while leaving the flat-screen panel module on the receiving surface. The flat-screen panel module may be raised, to recover the front cabinet remaining on the receiving surface. The separated front cabinet is separated every stuff, and recycled into the original stuff. If the front cabinet is unified with a speaker net or the like, the front cabinet is further dismantled in a step described later.

[3-3] Step of Dismantling Flat-Screen Panel Module

Then, the flat-screen panel module is dismantled (step S3-3). At this time, the flat-screen panel module is placed on receiving surface 21 of horizontal workbench 3 so that the surface side is directed upward similarly to that shown in FIG. 14, and an IC chip and a radiator plate of aluminum mounted on a side surface are detached from the flat-screen panel module in this state. The IC chip and the radiator plate are fixed with screws from the side surface. Therefore, the plasma TV is so placed that the front surface side is directed upward and a rotating mechanism is utilized, whereby the screws to be detached are quickly moved to the front side of the operator, and efficient dismantlement is enabled. The recovered radiator plate is recycled into the original stuff In the recovered substance in which the remaining flat-screen panel unit and the module chassis are integrated, glass of the flat-screen panel unit and aluminum of the module chassis are generally stuck to each other with an adhesive sheet, and hence glass and aluminum are separated from each other by heating, mechanical treatment or the like. Glass can be recycled as a glass material by removing a deposit such as an electrode material from the surface. Aluminum of the module chassis can be recycled as stuff.

[3-4] Step of Dismantling Unit Members

The recovered unit members such as the stand unit, the substrate unit, the speaker unit, the front cabinet etc. are further dismantled (step S3-4). This step is basically carried out with the horizontal workbench. In a case of a large-sized liquid crystal TV not loaded with the stand unit, the substrate unit, the speaker unit, the front cabinet etc., this step can be omitted. Also in a case loaded with unit members recyclable as such with no dismantlement, this step can be omitted.

As a specific method of dismantling the unit members such as the stand unit, the speaker unit etc., screws, caulkings etc. fastening the members are manually removed with an electric driver or the like, to dismantle the unit members. The recovered respective members are separated every stuff, and recycled as metal, plastic etc.

While this step has been shown after the step of dismantling the flat-screen panel module in the example shown in FIG. 21, the order of the step is not restricted to this, but the step may be carried out after the step S3-2, or may be carried out simultaneously with the step S3-2 or the step S3-3, so far as the unit members have been detached.

According to the inventive dismantling method for a flat-screen TV, effects similar to those of the aforementioned dismantling apparatus for a flat-screen TV according to the present invention can be attained.

According to the inventive dismantling apparatus for a flat-screen TV and the inventive dismantling method for a flat-screen TV, as hereinabove described, it is possible to efficiently and safely dismantle a large-sized liquid crystal TV, a medium/small-sized liquid crystal TV or a plasma TV in the same system, without employing a dedicated system or the like.

While the present invention is now more detailedly described with reference to Examples and experimental example, the present invention are not restricted to these Examples and experimental example.

Example 1

With inventive dismantling apparatus 1 for a flat-screen TV including inclined workbench 2, horizontal workbench 3, evacuation system 4 and transporter 5 schematically shown in FIG. 1, a large-sized liquid crystal TV of 37 inches was dismantled by the inventive dismantling method for a flat-screen TV according to the procedure following the flow chart schematically shown in FIG. 10. The operator was a male operator, while an inclined workbench having the maximum angle of inclination of 30° and movable to a horizontal state was employed. A horizontal workbench having a rotating function for a receiving surface was employed, and an evacuation system including a horizontal workbench was employed. Employed tools are an electric driver and an air nipper. The dismantled flat-screen TV is a large-sized liquid crystal TV having a screen size of 37 inches, manufactured in 2005. Table 1 shows results of measurement of dismantling times.

TABLE 1

| Step | Dismantling Time (sec.) |
| --- | --- |
| Step S1-1 | 15 |
| Step S1-2 | 211 |
| Step S1-3 | 136 |
| Step S1-4 | 132 |
| Step S1-5 | 329 |

COMPARATIVE EXAMPLE 1

In order to compare the effects of the dismantling apparatus and the dismantling method for a flat-screen TV according to the present invention, a large-sized liquid crystal TV of 37 inches was dismantled with a general well-known workbench (horizontal workbench). The operator is a male operator, and the employed apparatus is only the general workbench, having no inclining function and no evacuation system. All steps were carried out under the same general workbench. Employed tools are an electric driver and a nipper (complete manual type). The dismantled flat-screen TV is of the same type and the same size as the flat-screen TV in Example 1. Table 2 shows results of measurement of dismantling times.

TABLE 2

| Step | Dismantling Time (sec.) |
| --- | --- |
| Step S1-1 | 15 |
| Step S1-2 | 257 |
| Step S1-3 | 156 |
| Step S1-4 | 176 |
| Step S1-5 | 361 |

Comparing the dismantling times in Example 1 and comparative example 1, those in the step S1-1 are equivalent, while the dismantling times for the remaining steps were shorter in Example 1, to allow efficient operation. The effects of the dismantling apparatus and the dismantling method for a flat-screen TV according to the present invention can be confirmed.

Example 2

With the dismantling apparatus for a flat-screen TV according to the present invention schematically shown in FIG. 1, large-sized liquid crystal TVs, medium/small-sized liquid crystal TVs and a plasma TV were dismantled for four hours according to the aforementioned inventive dismantling method for a flat-screen TV (according to the flow chart schematically shown in FIG. 10 as to the large-sized liquid crystal TVs, according to the flow chart schematically shown in FIG. 17 as to the medium/small-sized liquid crystal TVs, and according to the flow chart schematically shown in FIG. 21 as to the plasma TV).

The specifications of the types of the dismantled flat-screen TVs are three types of large-sized liquid crystal TVs, two types of medium/small-sized TVs and one type of plasma TV. Tables 3 to 5 show dismantling times for the respective flat-screen TVs in the respective steps shown in Example 2. Tables 3, 4 and 5 show the dismantling times for the large-sized liquid crystal TVs, the medium/small-sized liquid crystal TVs and the plasma TV respectively.

TABLE 3

| | Dismantling Time (sec.) | | |
| --- | --- | --- | --- |
| Step | Type A | Type B | Type C |
| Step S1-1 | 15 | 22 | 15 |
| Step S1-2 | 257 | 366 | 374 |
| Step S1-3 | 156 | 161 | 173 |
| Step S1-4 | 176 | 162 | 267 |
| Step S1-5 | 361 | 303 | 352 |

TABLE 4

| Step | Dismantling Time (sec.) | |
| --- | --- | --- |
|  | Type D | Type E |
| Step S2-1 | 16 | 15 |
| Step S2-2 | 250 | 240 |
| Step S2-3 | 175 | 183 |
| Step S2-4 | 32 | 116 |

TABLE 5

| Step | Dismantling Time (sec.) Type F |
| --- | --- |
| Step S3-1 | 34 |
| Step S3-2 | 623 |
| Step S3-3 | 188 |
| Step S3-4 | 417 |

In a case where the aforementioned six types of TVs arrived at a recycling plant at random, the flat-screen TVs were dismantled. Table 6 shows the numbers of the arriving TVs of the respective types.

TABLE 6

|  | Type A | Type B | Type C | Type D | Type E | Type F |
| --- | --- | --- | --- | --- | --- | --- |
| Number of Arriving TVs | 9 | 11 | 14 | 14 | 1 | 6 |

The dismantlement was carried out by three operators, so that the first operator was in charge of the steps (steps S1-1 and S3-1) on the transporter and the steps (steps S1-2 and S3-2) on the inclined workbench, the second operator was in charge of the steps (steps S1-3, S1-5, S2-2, S2-4, S3-3 and S3-4) on the horizontal workbench, and the third operator was in charge of the step on the horizontal workbench and the steps (steps S1-4 and S2-3) under the evacuation system. Table 7 shows the numbers of completely dismantled TVs upon a lapse of an operating time of four hours. Eight TVs were in an intermediate stage of dismantlement.

TABLE 7

|  | Type A | Type B | Type C | Type D | Type E | Type F |
| --- | --- | --- | --- | --- | --- | --- |
| Number of Completely Dismantled TVs | 7 | 11 | 12 | 13 | 1 | 4 |

It was possible to dismantle 55 flat-screen TVs in four hours by employing the dismantling apparatus and the dismantling method for a flat-screen TV according to the present invention.

EXPERIMENTAL EXAMPLE

Figure 22:
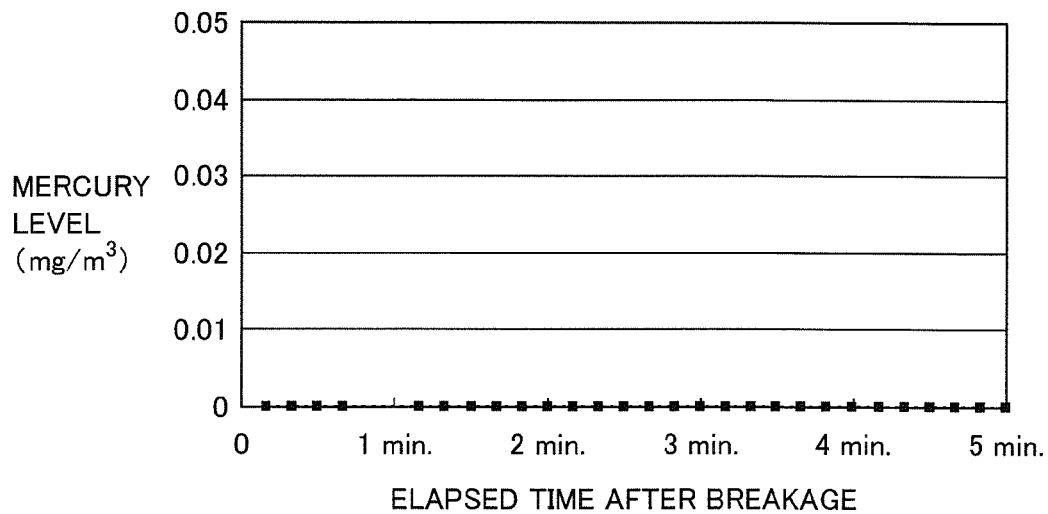
FIG. 22 is an explanatory diagram showing results of measurement of mercury levels in an experimental example of the dismantling method for a flat-screen TV according to the present invention.

In order to verify safety in a case where fluorescent tubes are broken in a step of dismantling a backlight chassis, safety was verified by dropping tools onto fluorescent tubes for intentionally breaking the fluorescent tubes and measuring mercury levels. More specifically, three fluorescent tubes of 2.4 mm in inner diameter and 704 mm in length loaded into a backlight chassis assembly taken out from a liquid crystal TV of 32 inches were intentionally broken in the state loaded into the backlight chassis assembly, by dropping tools onto the same under an evacuation system having the structure of the dismantling apparatus for a flat-screen TV according to the present invention. Mercury levels on positions separated by 100 mm upward from the broken fluorescent tubes were measured along with elapsed times. The mercury levels were measured by direct measurement according to an atomic absorption method, with a mercury gas monitor EM5 by Nippon Instruments Corporation. FIG. 22 shows the results of the measurement. The mercury level was regularly not more than the detection limit ($0.001$ mg/m$^3$). This is not more than $\frac{1}{20}$ of the administrative level ($0.025$ mg/m$^3$) according to the Industrial Safety and Health Law, and it has been confirmed that the fluorescent tubes are safe even if the same are broken.

The embodiment disclosed this time must be considered as illustrative in all points and not restrictive. The scope of the present invention is shown not by the above description but by the scope of claims for patent, and it is intended that all modifications within the meaning and range equivalent to the scope of claims for patent are included.

DESCRIPTION OF THE REFERENCE SIGNS 1 dismantling apparatus for flat-screen TV, 2 inclined workbench, 3 horizontal workbench, 4 evacuation system, 5 transporter, 11 receiving surface, 12 protrusion, 13 movable shaft, 21 receiving surface, 22 rotating shaft, 31 mercury removing means, 32 hood, 33 sucking portion, 34 pipe, 35 blower, 36 horizontal workbench, 37 vent hole, 38 pocket, 40 vessel evacuation system, 41 suction port, 42 pipe, 43 mercury removing means, 44 blower, 45 hood, 51 direct backlight liquid crystal TV, 52 rear cabinet, 53 stand, 54 front cabinet, 55 control board, 56 flat-screen panel module, 57 backlight chassis, 58 clip, 59 reflecting sheet, 60 fluorescent tube, 61 optical sheet, 62 flat-screen panel unit, 62a liquid crystal driver substrate, 62b plastic case, 62c bezel, 62d panel glass, 63 backlight chassis assembly, 64 bezel, 65 screw, 71 edge-lit liquid crystal TV, 72 rear cabinet, 73 stand, 74 front cabinet, 75 control board, 76 flat-screen panel module, 77 backlight chassis, 78 reflecting sheet, 79 reflecting sheet cover, 80 fluorescent tube, 81 optical sheet, 82 liquid crystal panel unit, 83 reflecting mirror, 84 light guide, 91 plasma TV, 92 rear cabinet, 93 stand, 94 front cabinet, 95 control board, 96 flat-screen panel module, 97 flat-screen panel unit, 98 module chassis, 99 front filter, 100 speaker.

The invention claimed is:
1. A dismantling apparatus for a flat-screen TV, applicable to both a large-sized flat-screen TV and a medium/small-sized flat-screen TV, comprising:
    an inclined workbench having an inclinable receiving surface for receiving the flat-screen TV thereon; and a horizontal workbench having a horizontal receiving surface,
    wherein the horizontal receiving surface includes a vent configured to allow air to be sucked from above the flat-screen TV downward;
    wherein the inclined workbench is formed to be capable of detaching a cabinet and a control board when the large-sized flat-screen TV is in an inclined position, and the horizontal workbench is formed to be capable of detaching a cabinet and a control board when the medium/small-sized flat-screen TV is in a horizontal position, and formed to be capable of detaching a flat-screen panel module when the large-sized flat-screen TV or the medium/small-sized flat-screen TV is in a horizontal position, and an evacuation system which includes a mercury removing means being an activated carbon filter which is adapted and configured to remove and recover mercury, a blower, and a pipe wherein the evacuation system sucks air downward and further sucks air away from a front side of an operator; and wherein all sucked air is discharged by passing the same through the mercury removing means.

2. The dismantling apparatus according to claim 1, further comprising a transporter for the flat-screen TV.

3. The dismantling apparatus according to claim 1, wherein the receiving surface of said horizontal workbench is rotatable in a horizontal plane.

4. The dismantling apparatus according to claim 1, wherein said inclined workbench is configured to receive the flat-screen TV being positioned with the display surface directed upward.

5. The dismantling apparatus according to claim 1, wherein the vent comprises a plurality, being more than three, vent holes through which air is sucked downward.

6. The dismantling apparatus according to claim 5, wherein the vent holes are configured and adapted to allow a screw detached from the flat-screen TV to pass downward through via gravity.

7. A dismantling apparatus for a flat-screen TV, applicable to both of a large-sized flat-screen TV and a medium/small-sized flat-screen TV, comprising:

an inclined workbench having an inclinable receiving surface for receiving the flat-screen TV thereon; and a horizontal workbench having a horizontal receiving surface, wherein the horizontal receiving surface includes a vent configured to allow air to be sucked from above the flat-screen TV downward;

wherein the inclined workbench is formed to be capable of detaching a cabinet and a control board when the large-sized flat-screen TV is in an inclined position, and the horizontal workbench is formed to be capable of detaching a cabinet and a control board when the medium/small-sized flat-screen TV is in a horizontal position, and formed to be capable of detaching a flat-screen panel module when the large-sized flat-screen TV or the medium/small-sized flat-screen TV is in a horizontal position, wherein said inclined workbench is configured to receive the flat-screen TV being positioned with the display surface directed upward, and an evacuation system which includes a mercury removing means being an activated carbon filter which is adapted and configured to remove and recover mercury, a blower, and a pipe wherein the evacuation system sucks air downward and further sucks air away from a front side of an operator; and wherein all sucked air is discharged by passing the same through the mercury removing means.

8. The dismantling apparatus according to claim 7, further comprising a transporter for the flat-screen TV.

9. The dismantling apparatus according to claim 7, wherein the receiving surface of said horizontal workbench is rotatable in a horizontal plane.

10. The dismantling apparatus according to claim 7, wherein the vent comprises a plurality, being more than three, vent holes through which air is sucked downward.

11. The dismantling apparatus according to claim 10, wherein the vent holes are configured and adapted to allow a screw detached from the flat-screen TV to pass downward through via gravity.

* * * * *